United States Patent [19]

Sagane et al.

[11] Patent Number: 5,610,254

[45] Date of Patent: Mar. 11, 1997

[54] ETHYLENE-α-OLEFIN-NONCONJUGATED POLYENE RANDOM COPOLYMER, RUBBER COMPOSITION, AND PROCESS FOR PREPARING THE RANDOM COPOLYMER

[75] Inventors: Toshihiro Sagane; Toshiyuki Tsutsui, both of Yamaguchi; Masaaki Kawasaki, Ichihara; Keiji Okada, Ichihara; Tetsuo Tojo, Ichihara; Tatsuya Tanizaki, Yamaguchi, all of Japan

[73] Assignee: Mitsui Petrochemical Industries, Ltd., Tokyo, Japan

[21] Appl. No.: 574,684

[22] Filed: Dec. 19, 1995

[30] Foreign Application Priority Data

Dec. 20, 1994 [JP] Japan .................................. 6-316952
Mar. 17, 1995 [JP] Japan .................................. 7-059290
Dec. 6, 1995 [JP] Japan .................................. 7-318401

[51] Int. Cl.⁶ .................... C08F 236/20; C08F 232/06; C08F 4/64
[52] U.S. Cl. .................... 526/282; 526/126; 526/127; 526/133; 526/134; 526/153; 526/160; 526/170; 526/281; 526/336; 526/943; 524/554; 524/570; 524/576; 524/579
[58] Field of Search .................... 526/282, 281, 526/336, 160, 170, 126, 127, 133, 134, 153, 943; 524/554, 576, 579, 570

[56] References Cited

U.S. PATENT DOCUMENTS 5,229,478  7/1993  Floyd et al. .................... 526/160

FOREIGN PATENT DOCUMENTS 0320762  12/1987  European Pat. Off. .
0347129  6/1988   European Pat. Off. .
0485822  11/1990  European Pat. Off. .
0549900  11/1991  European Pat. Off. .
62121711 11/1985  Japan .
2121711  6/1987   Japan .................................. 526/160
2051512  8/1988   Japan .
6228228  1/1992   Japan .

OTHER PUBLICATIONS

Journal of Organometallic Chemistry, vol. 288, (1985) pp. 63–67 Synthesis and Crystal Structure of a Chiral ansa–Zirconocene Derivative with Ethylene–Bridged Tetrahydroindenyl Ligands.

*Primary Examiner*—Fred Teskin
*Attorney, Agent, or Firm*—Sherman and Shalloway

[57] ABSTRACT

Disclosed is an ethylene-α-olefin-nonconjugated polyene random copolymer which is a random copolymer of (a) ethylene, (b) an α-olefin of 3 or more carbon atoms and (c) a nonconjugated polyene, and has such properties that (i) the copolymer contains (a) units derived from ethylene and (b) units derived from the α-olefin of 3 or more carbon atoms in a molar ratio of 40/60 to 95/5 ((a)/(b)), (ii) the iodine value is in the range of 1 to 50, (iii) the intrinsic viscosity ($\eta$), as measured in decahydronaphthalene at 135° C., is in the range of 0.1 to 8.0 dl/g, and (iv) the ratio $g\eta^*$ of the intrinsic viscosity ($\eta$) of the copolymer defined above to the intrinsic viscosity ($\eta$)$_{blank}$ of a linear ethylene-propylene copolymer having the same weight-average molecular weight as the ethylene-α-olefin-nonconjugated polyene random copolymer and having an ethylene content of 70% by mol, ($\eta$)/($\eta$)$_{blank}$, is in the range of 0.2 to 0.9 or the ratio g' of the intrinsic viscosity ($\eta$) of said random copolymer defined above to the intrinsic viscosity ($\eta$)$_{blank}$ of a linear ethylene-propylene copolymer having an ethylene content of 70% by mol which is determined by measurement of gel permeation chromatography (GPC) of ethylene-α-olefin-nonconjugated polyene random copolymer in orthodichlorobenzene at 140° C., ($\eta$)/($\eta$)$_{blank}$, is in the reange of 0.2 to 0.9.

14 Claims, 1 Drawing Sheet

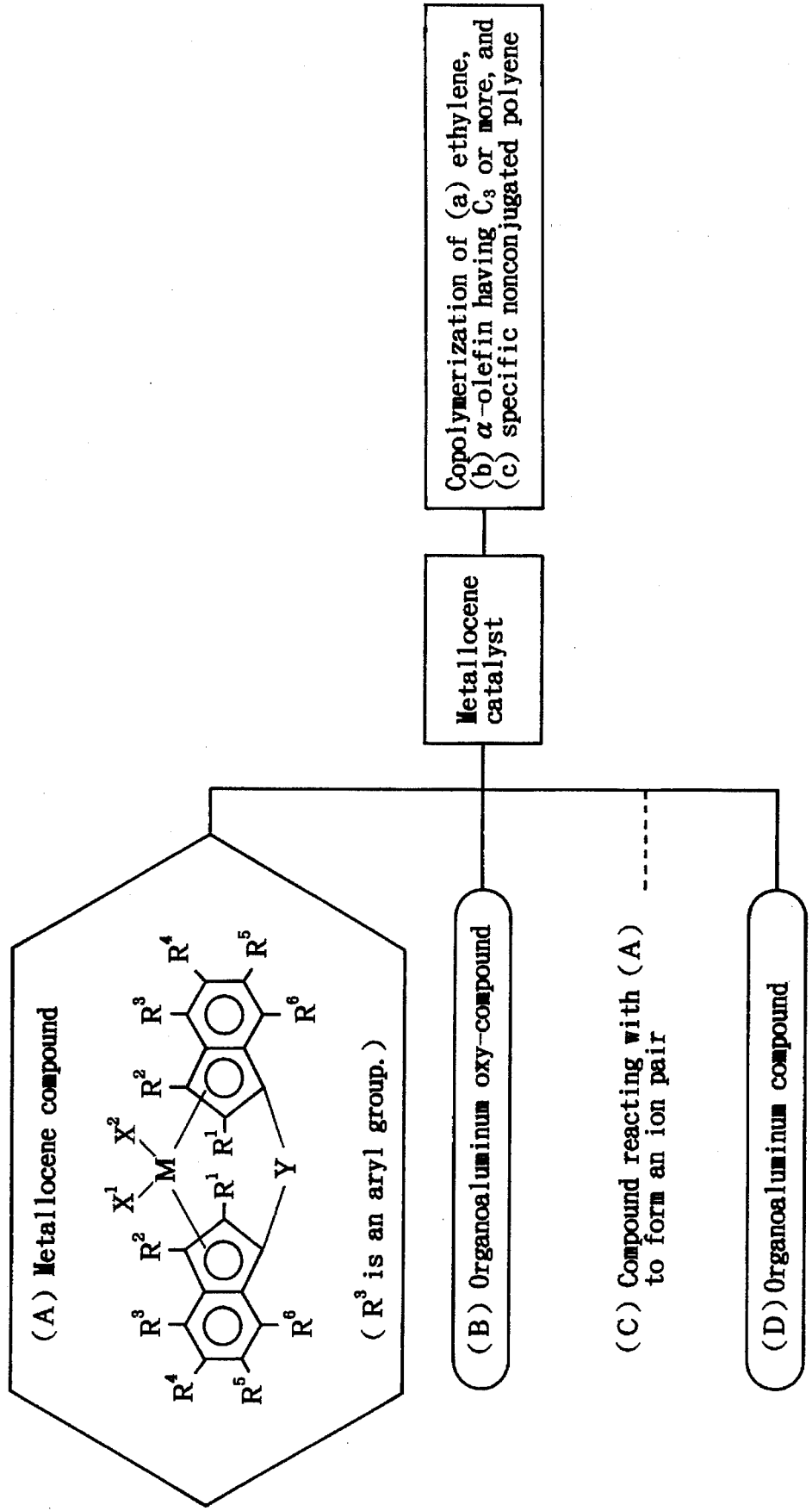

ETHYLENE-α-OLEFIN-NONCONJUGATED POLYENE RANDOM COPOLYMER, RUBBER COMPOSITION, AND PROCESS FOR PREPARING THE RANDOM COPOLYMER

FIELD OF THE INVENTION

The present invention relates to an ethylene-α-olefin-nonconjugated polyene random copolymer, a process for preparing the random copolymer and a vulcanizable rubber composition containing the random copolymer. More particularly, the invention relates to an ethylene-α-olefin-nonconjugated polyene random copolymer excellent in processability and mechanical properties, a process for preparing the random copolymer and a vulcanizable rubber composition excellent in mechanical strength, weathering resistance and ozone resistance as well as in processability.

BACKGROUND OF THE INVENTION

Because of their excellent weathering resistance, ozone resistance and heat aging characteristics, ethylene-α-olefin-nonconjugated polyene random copolymers (sometimes referred to simply as "ethylene copolymer rubbers" hereinafter) such as an ethylene-propylene-polyene terpolymer (EPDM) have been heretofore widely used as automobile materials, electrical wire materials, building and civil engineering materials and industrial materials.

The ethylene-α-olefin-nonconjugated polyene random copolymers used for such applications are desired to have good moldability, high vulcanizing rate and high vulcanization strength.

Of the ethylene copolymer rubbers, an ethylene-propylene-ethylidenenorbornene (ENB) copolymer rubber is known as a high rate vulcanizable copolymer, but the conventionally known ethylene-propylene-ENB copolymer rubber is poor in extrusion moldability.

An ethylene-propylene-dicyclopentadiene copolymer rubber is known as a copolymer rubber of excellent extrusion moldability, but this copolymer is low in the vulcanizing rate, and its vulcanization strength is not high.

For these reasons, how desired are the advents of an ethylene-α-olefin-nonconjugated polyene random copolymer and a rubber composition which are excellent in processability, vulcanizing rate and mechanical strength such as vulcanization strength and a process for preparing said random copolymer rubber.

Under such circumstances as described above, the present inventors have earnestly studied ethylene-α-olefin-nonconjugated polyene random copolymers, rubber compositions and processes for preparing the ethylene copolymer rubbers. As a result, they have found that an ethylene-α-olefin-nonconjugated polyene random copolymer having a long-chain branch in its molecule and having such properties that (i) the copolymer contains (a) units derived from ethylene and (b) units derived from the α-olefin of 3 or more carbon atoms in a molar ratio of 40/60 to 95/5 [(a)/(b)], (ii) the iodine value is in the range of 1 to 50, (iii) the intrinsic viscosity (η) is in the range of 0.1 to 8.0 dl/g, and (iv) the gη*, value is in the range of 0.2 to 0.9 or the g' value is not higher than 0.9, and a vulcanizable rubber composition containing this random copolymer have the above-mentioned excellent characteristics. The present inventors have also found that this random copolymer can be efficiently prepared by the use of a catalyst containing a specific metallocene compound. Based on these findings, the present invention has been accomplished.

OBJECT OF THE INVENTION

It is an object of the present invention to provide an ethylene-α-olefin-nonconjugated polyene random copolymer having good moldability, high vulcanizing speed and excellent mechanical properties such as high vulcanization strength, which was unable to be obtained by the conventional processes, a rubber composition containing the random copolymer and a process for preparing the random copolymer.

SUMMARY OF THE INVENTION

The ethylene-α-olefin-nonconjugated polyene random copolymer according to the present invention is a random copolymer of (a) ethylene, (2) an α-olefin of 3 or more carbon atoms and (c) a nonconjugated polyene containing, in one molecule, one carbon-to-carbon double bond polymerizable by a metallocene catalyst among carbon-to-carbon double bonds, and has the following properties:

(i) the copolymer contains (a) units derived from ethylene and (b) units derived from the α-olefin of 3 or more carbon atoms in a molar ratio of 40/60 to 95/5 [(a)/(b)], (ii) the iodine value is in the range of 1 to 50, (iii) the intrinsic viscosity (η), as measured in Decalin at 135° C., is in the range of 0.1 to 8.0 dl/g, and (iv) the ratio gη* of the intrinsic viscosity (η) of the copolymer defined above to the intrinsic viscosity (η)$_{blank}$ of a linear ethylene-propylene copolymer having the same weight-average molecular weight (by light scattering method) as the ethylene-α-olefin-nonconjugated polyene random copolymer and having an ethylene content of 70% by mol, (η)/(η)$_{blank}$, is in the range of 0.2 to 0.9.

The ethylene-(α-olefin-nonconjugated polyene copolymer according to the present invention can be specified by g' value instead of (iv) gη* value. That is, in the copolymer of the present invention, (iv) the ratio g' of the intrinsic viscosity (η) of said random copolymer defined above to the intrinsic viscosity (η)$_{blank'}$ calculated as a linear ethylene-propylene copolymer having an ethylene content of 70% by mol which is determined by measurement of gel permeation chromatography (GPC) of ethylene-α-olefin-nonconjugated polyene random copolymer in orthodichorobenzene at 140° C., (η)/(η)$_{blank'}$, is in the range of 0.2 to 0.9.

The process for preparing an ethylene-α-olefin-nonconjugated polyene random copolymer according to the present invention is a process in which the above-mentioned ethylene-α-olefin-nonconjugated polyene random copolymer is prepared using a metallocene catalyst containing a metallocene compound represented by the following formula (I):

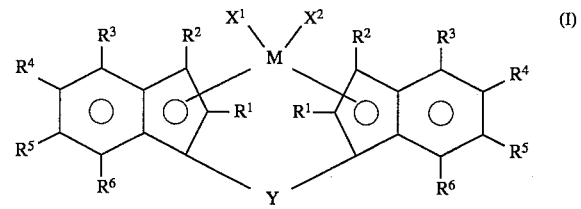

wherein M is a transition metal of Group IVB of the periodic table, $R^1$ is a hydrocarbon group of 1 to 6 carbon atoms, $R^2$, $R^4$, $R^5$ and $R^6$ may be the same as or different from each other, and are each hydrogen, a halogen atom or a hydrocarbon group of 1 to 6 carbon atoms, $R^3$ is an aryl group of 6 to 16 carbon atoms which may be substituted with a halogen atom, a hydrocarbon group of 1 to 20 carbon atoms or an organosilyl group, $X^1$ and $X^2$ may be the same as or different from each other, and are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent tin-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms).

The vulcanizable rubber composition according to the present invention contains the above-mentioned ethylene-α-olefin-nonconjugated polyene random copolymer.

The vulcanizable rubber composition of the invention may further contain other components than the ethylene-α-olefin-nonconjugated polyene random copolymer. For example, the rubber composition can contain a reinforcing agent and/or an inorganic filler in an amount of 10 to 200 parts by weight and a softening agent in an amount of 10 to 200 parts by weight, based on 100 parts by weight of the ethylene-α-olefin-nonconjugated polyene random copolymer.

The vulcanized rubber according to the present invention is obtained by the aforementioned rubber composition.

BRIEF DESCRIPTION OF THE DRAWING

FIG. 1 is an explanatory view showing steps of a process for preparing a metallocene catalyst used for preparing the ethylene-α-olefin-nonconjugated polyene random copolymer according to the present invention.

DETAILED DESCRIPTION OF THE INVENTION

First, the ethylene-α-olefin-nonconjugated polyene random copolymer according to the invention is described in detail.

Ethylene-(α-olefin-nonconjugated polymer random copolymer

The ethylene-α-olefin-nonconjugated polyene random copolymer of the invention is an elastomer which can be obtained by copolymerizing (a) ethylene, (b) an α-olefin of 3 or more carbon atoms and (c) a nonconjugated polyene containing, in one molecule, one carbon-to-carbon double bond polymerizable by a metallocene catalyst among carbon-to-carbon double bonds, and has the properties described below.

The ethylene-α-olefin-nonconjugated polyene random copolymer (hereinafter, sometimes referred to as "random copolymer") of the invention is derived from (a) ethylene, (b) an α-olefin of 3 or more carbon atoms and (c) a specific nonconjugated polyene.

The α-olefin of 3 or more carbon atoms (b) is specifically an α-olefin of 3 to 20 carbon atoms. Examples of the α-olefins of 3 to 20 carbon atoms include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. These α-olefins may be used in combination.

Of these, preferred are α-olefins of 3 to 10 carbon atoms, and particularly preferred are propylene, 1-butene, 1-hexene and 1-octene.

The nonconjugated polyene (c) used in the invention is a nonconjugated polyene containing, in one molecule, one carbon-to-carbon double bond polymerizable by a metallocene catalyst among carbon-to-carbon double bonds. The nonconjugated polyene (c) does not include a chain polyene having vinyl groups at the both ends. When one double bond among two or more double bonds is an end vinyl group, it is preferred that other double bonds are not end vinyl groups and an internal olefinic structure is formed. Wherein, vinyl group means —CH=CH$_2$. Examples of such nonconjugated polyenes (c) include aliphatic polyenes, such as:

1,4-hexadiene, 3-methyl-1,4-hexadiene, 4-methyl-1,4-hexadiene, 5-methyl-1,4-hexadiene, 4-ethyl-1,4-hexadiene, 3-methyl-1,4-hexadiene and 3, 3-dimethyl-1,4-hexadiene;

5-methyl-1,4-heptadiene, 5-ethyl-1,4-heptadiene, 5-methyl-1,5-heptadiene, 6-methyl-1,5-heptadiene and 5-ethyl-1, 5-heptadiene;

1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1, 6-octadiene and 6-butyl-1, 6-octadiene;

4-methyl-1,4-nonadiene, 5-methyl-1,4-nonadiene, 4-ethyl-1,4-nonadiene, 5-ethyl-1,4-nonadiene, 5-methyl-1, 5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1, 6-nonadiene, 7-methyl-i, 7-nonadiene, 8-methyl-1,7-nonadiene and 7-ethyl-1,7-nonadiene;

5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene and 8-ethyl-1, 8-decadiene; and 6-methyl-1, 6-undecadiene and 9-methyl-1,8-undecadiene.

Preferred alicyclic polyenes are those consisting of alicyclic parts having one unsaturated bond and chain parts having internal olefinic bond, and example thereof includes 5-ethylidene-2-norbornene, 5-isopropylidene-2-norbornene, 6-chloromethyl-5-isoprenyl-2-norbornene. Further, triene compounds such as 2,3-diisopropylidene-5-norbornene and 2-ethylene-3-isopropylidene can be used. These polyenes may be used in combination of two or more kinds.

In the present invention, nonconjugated polyenes having 7 or more carbon atoms, e.g., 7-methyl -1,6-octadiene (MOD), 5-ethylidene-2-norbornene (ENB) and 1,4-hexadiene are preferably used in the invention.

(i) Ratio of (a) ethylene component to (b) α-olefin component ((a)/(b))

The ethylene-α-olefin-nonconjugated polyene random copolymer provided by the invention contains (a) units derived from ethylene and (b) units derived from the olefin of 3 or more carbon atoms (hereinafter, sometimes referred to as "α-olefin") in a molar ratio of 40/60 to 95/5 [(a)/(b)], preferably 55/45 to 90/10.

(ii) Iodine value

The iodine value of the ethylene-α-olefin-nonconjugated polyene random copolymer is in the range of 1 to 50, preferably 2 to 40, more preferably 5 to 35, particularly preferably 7 to 30.

The ethylene-α-olefin-nonconjugated polyene random copolymer having an iodine value of the above range has a high vulcanizing speed, and high-speed vulcanization thereof is possible.

(iii) Intrinsic viscosity (η)

The intrinsic viscosity (η) of the ethylene-α-olefin-nonconjugated polyene random copolymer, as measured in Decalin, i.e. decahydronapthalene, at 135° C., is in the range of 0.1 to 8.0 dl/g, preferably 0.2 to 6 dl/g.

(iv) gη* value or g' value

Measurement of gη*

The gη* value is defined as a ratio of the intrinsic viscosity (η) of the ethylene-α-olefin-nonconjugated polyene random copolymer measured above to the intrinsic viscosity $(η)_{blank}$ of a linear ethylene-propylene copolymer which has the same weight-average molecular weight (by light scattering method) as the ethylene-α-olefin-nonconjugated polyene random copolymer and has an ethylene content of 70% by mol ($gη^*=(η)/(η)_{blank}$).

Specifically, $(η)_{blank}$ is determined by converting a weight-average molecular weight $M_w$ measured by the light scattering method to a viscosity-average molecular weight $M_v$ and then introducing the obtained $M_v$ into the following formula (I).

$$(η)_{blank}=7.2\times 10^{-4} M_v^{0.667} \tag{1}$$

The gη* value of the ethylene-α-olefin-nonconjugated polyene random copolymer is in the range of 0.2 to 0.9, preferably 0.4 to 0.8.

Measurement of g'

The g' value is defined as a ratio of an intrinsic viscosity (η) measured by the above method (iii) to an intrinsic viscosity $(η)_{blank'}$ calculated as a linear ethylene-propylene copolymer (EPR) having an ethylene content of 70% (by mol) which is determined by measurement of gel permeation chromatography (GPC) of ethylene-α-olefin-nonconjugated polyene random copolymer in orthodichlorobenzene at 140° C. ($g'=(η)/(η)_{blank'}$). The $(η)_{blank'}$ is determined in the following manner. First, the molecular weight calculated as polystyrene, $M_{i-PSt}$ of each fraction measured by GPC of ethylene-α-olefin-nonconjugated polyene random copolymer is introduced into the following formulas to obtain the molecular weight calculated as EPR, $Mi_{-EPR}$.

$$(η)_{i-PSt}.M_{i-PSt}=(η)_{i-EPR}.M_{i-EPR},$$

$$(η)_{i-PSt}=1.37\times 10^{-4}M_{i-PSt}^{0.686},$$

and $$(η)_{i-EPR}=7.2\times 10^{-4} M_{i-EPR}^{0.667}.$$

The calculated $M_{i-EPR}$ is introduced into the following formula (2) to obtain $(η)_{i-blank'}$ of each fraction.

$$(η)_{i-blank'}=7.2\times 10^{31\ 4} M_{i-EPR}^{0.667} \tag{2}$$

wherein i means each fraction fractionated by GPC.

Then, the thus obtained $(η)_{i-blank'}$ is introduced into the following formula (III) to obtain $(η)_{blank'}$.

$$(η)_{blank'}=\Sigma_{\overline{10\gamma}i}.(η)_{i-blank'}/\Sigma_{\overline{\omega}i} \tag{3}$$

wherein $\overline{\omega}$ means a weight fraction.

Thus, the value for $(η)_{blank'}$ is obtained and the g' value is determined as a ratio of (η) to $(η)_{blank'}$.

The g' value $[(η)/(η)_{blank'}]$ of the ethylene-α-olefin-nonconjugated polyene random copolymer is in the range of 0.2 to 0.9, preferably 0.4 to 0.85, more preferably 0.4 to 0.8.

As described above, the gη* value or the g' value of the ethylene-α-olefin-nonconjugated polyene random copolymer of the invention is considerably smaller than 1, and this indicates that a long-chain branch is formed in the molecule. Such random copolymer rubber is excellent in moldability.

The ethylene-α-olefin-nonconjugated polyene random copolymer may be modified with polar monomers, and the modified product will be described later in detail.

The ethylene-α-olefin-nonconjugated polyene random copolymer is obtainable by random copolymerizing (a) ethylene, (b) the α-olefin of 3 or more carbon atoms and (c) the nonconjugated polyene in the presence of a metallocene catalyst.

The metallocene catalyst used in the invention desirably contains a specific metallocene compound (A) described below.

There is no specific limitation on the metallocene catalyst preferably used in the invention, except that the metallocene catalyst contains the metallocene compound (A). For example, the metallocene catalyst may be formed from (A) the metallocene compound and (B) an organoaluminum oxy-compound and/or (C) a compound which reacts with the metallocene compound (A) to form an ion pair, or it may be formed from the component (A), the component (B) and/or the component (C), and (D) an organoaluminum compound.

These components are described below in detail.

FIG. 1 shows steps of one example of a process for preparing a metallocene catalyst used in the invention and steps of one example of a process for preparing an ethylene-α-olefin-nonconjugated polyene random copolymer.

(A) Metallocene Compound

In the invention, a compound represented by the following formula (I) is used as the metallocene compound (A).

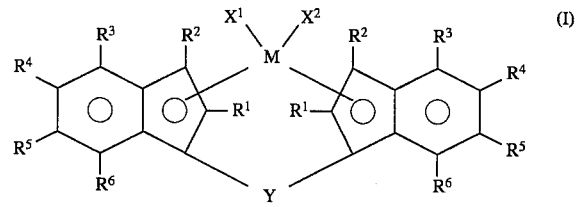

In the formula (I), M is a transition metal atom of Group IVB of the periodic table, specifically titanium, zirconium or hafnium, particularly preferably zirconium.

Substituent $R^1$ $R^1$ is a hydrocarbon group of 1 to 6 carbon atoms. Examples of such hydrocarbon groups include alkyl groups, such as methyl, ethyl, n-propyl, isopropyl, n-butyl, isobutyl, sec-butyl, tert-butyl, n-pentyl, neopentyl, n-hexyl and cyclohexyl; and alkenyl groups, such as vinyl and propenyl.

Of these, preferred are alkyl groups whose carbon bonded to the indenyl group is primary carbon. More preferred are alkyl groups of 1 to 4 carbon atoms, and particularly preferred are methyl and ethyl.

Substituents $R^2$, $R^4$, $R^5$ and $R^6$ $R^2$, $R^4$, $R^5$ and $R^6$ may be the same as or different from each other, and are each hydrogen, a halogen atom or a hydrocarbon group of 1 to 6 carbon atoms identical with $R^1$.

The halogen atom is fluorine, chlorine, bromine or iodine.

Substituent $R^3$ $R^3$ is an aryl group of 6 to 16 carbon atoms. This aryl group may be substituted with a halogen atom, a hydrocarbon group of 1 to 20 carbon atoms or an organosilyl group.

Examples of the aryl groups include phenyl, α-naphthyl, β-naphthyl, anthracenyl, phenanthryl, pyrenyl, acenaphthyl, phenalenyl, aceanthrylenyl, tetrahydronaphthyl, indanyl and biphenyl. Of these, preferred are phenyl, naphthyl, anthracenyl and phenanthryl.

Examples of the hydrocarbon groups of 1 to 20 carbon atoms, which are substituents of the aryl groups, include:

alkyl groups, such as methyl, ethyl, propyl, butyl, hexyl, cyclohexyl, octyl, nonyl, dodecyl, icosyl, norbornyl and adamantyl;

alkenyl groups, such as vinyl, propenyl and cyclohexenyl;

arylalkyl groups, such as benzyl, phenylethyl and phenylpropyl; and aryl groups, such as the above-mentioned aryl groups, tolyl, dimethylphenyl, trimethylphenyl, ethylphenyl, propylphenyl, methylnaphthyl and benzylphenyl.

Examples of the organosilyl groups include trimethylsilyl, triethylsilyl and triphenylsilyl.

Substituents $X^1$ and $X^2$ $X^1$ and $X^2$ may be the same as or different from each other, and are each hydrogen, a halogen atom, a hydrocarbon group of 1 to 20 carbon atoms which may be substituted with halogen, an oxygen-containing group or a sulfur-containing group. Examples of the halogen atoms and the hydrocarbon groups are identical with those mentioned above.

Examples of the oxygen-containing groups include hydroxyl groups; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; and trifluoroacetylacetonato group.

Examples of the sulfur-containing groups include substituents obtained by replacing oxygen with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Of these, preferred are halogen atoms and hydrocarbon groups of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms).

More specifically, there can be mentioned:

divalent hydrocarbon groups of 1 to 20 carbon atoms, such as alkylene groups (e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene), and arylalkylene groups (e.g., diphenylmethylene and diphenyl-1,2-ethylene);

divalent halogenated hydrocarbon groups obtained by halogenating the above-exemplified divalent hydrocarbon groups of 1 to 20 carbon atoms, such as chloromethylene;

divalent silicon-containing groups, such as silylene alkylsilylene, alkylarylsilylene and arylsilylene groups (e.g., methylsilylene, dimethylsilylene, diethylsilylene, di(n-propyl) silylene, di(i-propyl)silylene, di(cyclohexyl) silylene, methylphenylsilylene, diphenylsilylene, di(p-tolyl)silylene and di(p-chlorophenyl)silylene), and alkyldisilyl, alkylaryldisilyl and aryldisilyl groups (e.g., tetramethyl-1,2-disilyl and tetraphenyl-1,2-disilyl); and divalent germanium-containing groups or divalent tin-containing groups obtained by replacing silicon with germanium or tin in the above-exemplified divalent silicon-containing groups.

$R^7$ is the same halogen atom, hydrocarbon group of 1 to 20 carbon atoms or halogenated hydrocarbon group of 1 to 20 carbon atoms as described above.

Of these, preferred as Y are divalent silicon-containing groups and divalent germanium-containing groups. More preferred are divalent silicon-containing groups, and particularly preferred are alkylsilylene, alkylarylsilylene and arylsilylene.

The two ligands having a cyclopentadienyl skeleton, which are linked to each other by way of Y, may be the same as or different from each other.

Listed below are examples of the transition metal compounds represented by the above formula [I].

rac-Dimethylsilylene-bis{1-(2-methyl-4-phenylindenyl)}zirconium dichloride, rac-Dimethylsilylene-bis{1-(2-methyl-4-(α-naphthyl)indenyl)}zirconium dichloride, rac-Dimethylsilylene-bis{1-(2-methyl-4-(β-naphthyl)indenyl}zirconium dichloride, rac-Dimethylsilylene-bis{1-(2-methyl-4-(1-anthracenyl)indenyl)}zirconium dichloride, rac-Dimethylsilylene-bis{1-(2-methyl-4-(2-anthracenyl)indenyl)}zirconium dichloride, rac-Dimethylsilylene-bis{1-(2-methyl-4-(9-anthracenyl)indenyl)}zirconium dichloride, rac-Dimethylsilylene-bis{1-(2-methyl-4-(9-phenanthryl)indenyl)}zirconium dichloride, rac-Dimethylsilylene-bis{1-(2-methyl-4-(p-fluorophenyl)indenyl)}zirconium dichloride, rac-Dimethylsilylene-bis{1-(2-methyl-4-(pentafluorophenyl)indenyl)}zirconium dichloride, rac-Dimethylsilylene-bis{1-(2-methyl-4-(p-chlorophenyl)indenyl)}zirconium dichloride, rac-Dimethylsilylene-bis{1-(2-methyl-4-(m-chlorophenyl)indenyl)}zirconium dichloride, rac-Dimethylsilylene-bis{1-(2-methyl-4-(o-chlorophenyl)indenyl)}zirconium dichloride, rac-Dimethylsilylene-bis{1-(2-methyl-4-(o,p-dichlorophenyl-1-indenyl)}zirconium dichloride, rac-Dimethylsilylene-bis{1-(2-methyl-4-(p-bromophenyl)indenyl)}zirconium dichloride, rac-Dimethylsilylene-bis{1-(2-methyl-4-(p-tolyl)indenyl)}zirconium dichloride, rac-Dimethylsilylene-bis{1-(2-methyl-4-(m-tolyl)indenyl)}zirconium dichloride, rac-Dimethylsilylene-bis{1-(2-methyl-4-(o-tolyl)indenyl)}zirconium dichloride, rac-Dimethylsilylene-bis{1-(2-methyl-4-(o,o'-dimethylphenyl)indenyl)}zirconium dichloride, rac-Dimethylsilylene-bis{1-(2-methyl-4-(p-ethylphenyl)indenyl)}zirconium dichloride,
rac-Dimethylsilylene-bis{1-(2-methyl-4-(p-i-propylphenyl)indenyl)}zirconium dichloride,
rac-Dimethylsilylene-bis{1-(2-methyl-4-(p-benzylphenyl)indenyl)}zirconium dichloride,
rac-Dimethylsilylene-bis{1-(2-methyl-4-(p-biphenyl)indenyl)}zirconium dichloride,
rac-Dimethylsilylene-bis{1-(2-methyl-4-(m-biphenyl)indenyl)}zirconium dichloride,
rac-Dimethylsilylene-bis{1-(2-methyl-4-(p-trimethylsilylphenyl)indenyl)}zirconium dichloride,
rac-Dimethylsilylene-bis{1-(2-methyl-4-(m-trimethylsilylphenyl)indenyl)}zirconium dichloride,
rac-Dimethylsilylene-bis{1-(2-phenyl-4-phenyl)indenyl)}zirconium dichloride,
rac-Diethylsilylene-bis{1-(2-methyl-4-phenyl)indenyl)}zirconium dichloride,
rac-Di(i-propyl) silylene-bis{1-(methyl-4-phenylindenyl)}zirconium dichloride,
rac-Di(n-butyl)silylene-bis{1-(2-methyl-4-phenylindenyl)}zirconium dichloride,
rac-Dicyclohexylsilylene-bis{1-(2-methyl-4-phenylindenyl)}zirconium dichloride,
rac-Methylphenylsilylene-bis{1-(2-methyl-4-phenylindenyl)}zirconium dichloride,
rac-Diphenylsilylene-bis{1-(2-methyl-4-phenylindenyl)}zirconium dichloride,
rac-Di(p-tolyl)silylene-bis{1-(2-methyl-4-phenylindenyl)}zirconium dichloride,
rac-Di(p-chlorophenyl)silylene-bis{1-(2-methyl-4-phenylindenyl)}zirconium dichloride,
rac-Methylene-bis{1-(2-methyl-4-phenylindenyl)}zirconium dichloride,
rac-Ethylene-bis{1-(2-methyl-4-phenylindenyl)}zirconium dichloride,
rac-Dimethylgermylene-bis{1-(2-methyl-4-phenylindenyl)}zirconium dichloride,
rac-Dimethylstannylene-bis{1-(2-methyl-4-phenylindenyl)}zirconium dichloride,
rac-Dimethylsilylene-bis{1-(2-methyl-4-phenylindenyl)}zirconium dibromide,
rac-Dimethylsilylene-bis{1-(2-methyl-4-phenylindenyl)}zirconium dimethyl,
rac-Dimethylsilylene-bis{1-(2-methyl-4-phenylindenyl)}zirconium methylchloride,
rac-Dimethylsilylene-bis{1-(2-methyl-4-phenylindenyl)}zirconium chloride SO$_2$Me,
rac-Dimethylsilylene-bis{1-(2-methyl-4-phenylindenyl)}zirconium chloride OSO$_2$Me,
rac-Dimethylsilylene-bis{1-(2-methyl-4-phenylindenyl)}zirconium monochloride mono(trifluoromethanesulfonato),
rac-Dimethylsilylene-bis{1-(2-methyl-4-phenylindenyl)}zirconium di(trifluoromethanesulfonato),
rac-Dimethylsilylene-bis{1-(2-methyl-4-phenylindenyl)}zirconium di(p-toluenesulfonato),
rac-Dimethylsilylene-bis{1-(2-methyl-4-phenylindenyl)}zirconium di(methylsulfonato),
rac-Dimethylsilylene-bis{1-(2-methyl-4-phenylindenyl)}zirconium di(trifluoromethanesulfinato,
rac-Dimethylsilylene-bis{1-(2-methyl-4-phenylindenyl)}zirconium di(trifluoroacetate),
rac-Dimethylsilylene-bis{1-(2-methyl-4-phenylindenyl)}zirconium monochloride(n-butoxide),
rac-Dimethylsilylene-bis{1-(2-methyl-4-phenylindenyl)}zirconium di(n-butoxide),
rac-Dimethylsilylene-bis{1-(2-methyl-4-phenylindenyl)}zirconium monochloride(phenoxide),
rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(βnaphthyl)indenyl}zirconium dichloride,
rac-Dimethylsilylene-bis{1-(2-ethyl-4-(2-methyl-1-naphthyl)indenyl)}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride,
rac-Dimethylsilylene-bis{1-(2-ethyl-4-(2,4-dimethylphenyl)indenyl)}zirconium dichloride,
rac-Dimethylsilylene-bis{1-(2-ethyl-4-(2,5-dimethylphenyl)indenyl)}zirconium dichloride,
rac-Dimethylsilylene-bis{1-(2-ethyl-4-(2,4,6-trimethylphenyl)indenyl)}zirconium dichloride,
rac-Dimethylsilylene-bis{1-(2-ethyl-4-(o-chlorophenyl)indenyl)}zirconium dichloride,
rac-Dimethylsilylene-bis{1-(2-ethyl-4-(m-chlorophenyl)indenyl)}zirconium dichloride,
rac-Dimethylsilylene-bis{1-(2-ethyl-4-(p-chlorophenyl)indenyl)}zirconium dichloride,
rac-Dimethylsilylene-bis{1-(2-ethyl-4-(2,3-dichlorophenyl)indenyl)}zirconium dichloride,
rac-Dimethylsilylene-bis{1-(2-ethyl-4-(2,6-dichlorophenyl)indenyl)}zirconium dichloride,
rac-Dimethylsilylene-bis{1-(2-ethyl-4-(3,5-dichlorophenyl)indenyl)}zirconium dichloride,
rac-Dimethylsilylene-bis{1-(2-ethyl-4-(2-bromophenyl)indenyl)}zirconium dichloride,
rac-Dimethylsilylene-bis{1-(2-ethyl-4-(3-bromophenyl)indenyl)}zirconium dichloride,
rac-Dimethylsilylene-bis{1-(2-ethyl-4-(4-bromophenyl)indenyl)}zirconium dichloride,
rac-Dimethylsilylene-bis{1-(2-ethyl-4-(4-biphenylyl)indenyl)}zirconium dichloride,
rac-Dimethylsilylene-bis{1-(2-ethyl-4-(4-trimethylsilylphenyl)indenyl)}zirconium dichloride,
rac-Dimethylsilylene-bis{1-(2-n-propyl-4-phenylindenyl)}zirconium dichloride,
rac-Dimethylsilylene-bis{1-(2-n-propyl-4-((α-naphthyl)indenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(2-methyl-1-naphthyl)indenyl)}zirconium dichloride,
rac-Dimethylsilylene-bis{1-(2-n-propyl-4-(5-acenaphthyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilylene-bis{1-(2-i-propyl-4-phenylindenyl)}zirconium dichloride, rac-Dimethylsilylene-bis{1-(2-i-propyl-4-(α-naphthyl)indenyl)}zirconium dichloride,
rac-Dimethylsilylene-bis{1-(2-i-propyl-4-(β-naphthyl)indenyl)}zirconium dichloride,
rac-Dimethylsilylene-bis{1-(2-i-propyl-4-(8-methyl-9-naphthyl)indenyl)}zirconium dichloride,
rac-Dimethylsilylene-bis{1-(2-i-propyl-4-(5-acenaphthyl)indenyl)}zirconium dichloride,
rac-Dimethylsilylene-bis{1-(2-i-propyl-4-(9-anthracenyl)indenyl)}zirconium dichloride,
rac-Dimethylsilylene-bis{1-(2-i-propyl-4-(9-phenanthryl)indenyl)}zirconium dichloride,
rac-Dimethylsilylene-bis{1-(2-s-butyl-4-phenylindenyl)}zirconium dichloride,
rac-Dimethylsilylene-bis{1-(2-s-butyl-4-(α-naphthyl)indenyl)}zirconium dichloride,
rac-Dimethylsilylene-bis{1-(2-s-butyl-4-(β-naphthyl)indenyl)}zirconium dichloride,
rac-Dimethylsilylene-bis{1-(2-s-butyl-4-(2-methyl-1-naphthyl)indenyl)}zirconium dichloride,
rac-Dimethylsilylene-bis{1-(2-s-butyl-4-(5-acenaphthyl)indenyl)}zirconium dichloride,
rac-Dimethylsilylene-bis{1-(2-s-butyl-4-(9-anthracenyl)indenyl)}zirconium dichloride,
rac-Dimethylsilylene-bis{1-(2-s-butyl-4-(9-phenanthryl)indenyl)}zirconium dichloride,
rac-Dimethylsilylene-bis{1-(2-n-pentyl-4-phenylindenyl)}zirconium dichloride,
rac-Dimethylsilylene-bis{1-(2-n-pentyl-4-(α-naphthyl)indenyl)}zirconium dichloride,
rac-Dimethylsilylene-bis{1-(2-n-butyl-4-phenylindenyl)}zirconium dichloride,
rac-Dimethylsilylene-bis{1-(2-n-butyl-4-(α-naphthyl)indenyl)}zirconium dichloride,
rac-Dimethylsilylene-bis{1-(2-n-butyl-4-(β-naphthyl)indenyl)}zirconium dichloride,
rac-Dimethylsilylene-bis{1-(2-n-butyl-4-(2-methyl-1-naphthyl)indenyl)}zirconium dichloride,
rac-Dimethylsilylene-bis{1-(2-n-butyl-4-(5-acenaphthyl)indenyl)}zirconium dichloride,
rac-Dimethylsilylene-bis{1-(2-n-butyl-4-(9-anthracenyl)indenyl)}zirconium dichloride,
rac-Dimethylsilylene-bis{1-(2-n-butyl-4-(9-phenanthryl)indenyl)}zirconium dichloride,
rac-Dimethylsilylene-bis{1-(2-i-butyl-4-phenylindenyl)}zirconium dichloride,
rac-Dimethylsilylene-bis{1-(2-i-butyl-4-(α-naphthyl)indenyl)}zirconium dichloride,
rac-Dimethylsilylene-bis{1-(2-i-butyl-4-(β-naphthyl)indenyl)}zirconium dichloride,
rac-Dimethylsilylene-bis{1-(2-i-butyl-4-(2-methyl-1-naphthyl)indenyl)}zirconium dichloride,
rac-Dimethylsilylene-bis{1-(2-i-butyl-4-(5-acenaphthyl)indenyl)}zirconium dichloride,
rac-Dimethylsilylene-bis{1-(2-i-butyl-4-(9-anthracenyl)indenyl)}zirconium dichloride,
rac-Dimethylsilylene-bis{1-(2-i-butyl-4-(9-phenanthryl)indenyl)}zirconium dichloride,
rac-Dimethylsilylene-bis{1-(2-neopentyl-4-phenylindenyl)}zirconium dichloride,
rac-Dimethylsilylene-bis{1-(2-neopentyl-4-(α-naphthyl)indenyl)}zirconium dichloride,
rac-Dimethylsilylene-bis{1-(2-n-hexyl-4-phenylindenyl)}zirconium dichloride,
rac-Dimethylsilylene-bis{1-(2-n-hexyl-4-(α-naphthyl)indenyl)}zirconium dichloride,
rac-Methylphenylsilylene-bis{1-(2-ethyl-4-phenylindenyl)}zirconium dichloride,
rac-Methylphenylsilylene-bis{1-(2-ethyl-4-(α-naphthyl)indenyl)}zirconium dichloride,
rac-Methylphenylsilylene-bis{1-(2-ethyl-4-(9-anthracenyl)indenyl)}zirconium dichloride,
rac-Methylphenylsilylene-bis{1-(2-ethyl-4-(9-phenanthryl)indenyl)}zirconium dichloride,
rac-Diphenylsilylene-bis{1-(2-ethyl-4-phenylindenyl)}zirconium dichloride,
rac-Diphenylsilylene-bis{1-(2-ethyl-4-(α-naphthyl)indenyl)}zirconium dichloride,
rac-Diphenylsilylene-bis{1-(2-ethyl-4-(9-anthracenyl)indenyl)}zirconium dichloride,
rac-Diphenylsilylene-bis{1-(2-ethyl-4-(9-phenanthryl)indenyl)}zirconium dichloride,
rac-Diphenylsilylene-bis{1-(2-ethyl-4-(4-biphenylyl)indenyl)}zirconium dichloride,
rac-Methylene-bis{1-(2-ethyl-4-phenylindenyl)}zirconium dichloride,
rac-Methylene-bis{1-(2-ethyl-4-(α-naphthyl)indenyl)}zirconium dichloride,
rac-Ethylene-bis{1-(2-ethyl-4-phenylindenyl)}zirconium dichloride,
rac-Ethylene-bis{1-(2-ethyl-4-(α-naphthyl)indenyl)}zirconium dichloride,
rac-Ethylene-bis{1-(2-n-propyl-4-(α-naphthyl)indenyl)}zirconium dichloride,
rac-Dimethylgermylene-bis{1-(2-ethyl-4-phenylindenyl)}zirconium dichloride,
rac-Dimethylgermylene-bis{1-(2-ethyl-4-(α-naphthyl)indenyl)}zirconium dichloride, and
rac-Dimethylgermylene-bis{1-(2-n-propyl-4-phenylindenyl)}zirconium dichloride.

Also employable are compounds obtained by replacing zirconium with titanium or hafnium in the above-exemplified compounds.

In the invention, as the catalyst component, the metallocene compounds mentioned above are generally used in the form of racemic modification, but they can be used in the form of R type or S type.

The metallocene compounds may be used in combination of two or more kinds.

The metallocene compounds can be prepared in accordance with "Journal of Organometallic Chem.", 288 (1985), pp. 63–67 and European Patent Publication No. 0,320,762.

(B) Organoaluminum oxy-compound

The organoaluminum oxy-compound (B) used in the invention may be aluminoxane conventionally known or may be such a benzene-insoluble organoaluminum oxy-compound as exemplified in Japanese Patent Laid-Open Publication No. 78687/1990.

The conventionally known aluminoxane can be prepared by, for example, the following procedures.

(1) A procedure of adding an organoaluminum compound such as trialkylaluminum to a hydrocarbon medium suspension of a compound containing adsorbed water or a salt containing water of crystallization, e.g., magnesium chloride hydrate, copper sulfate hydrate, aluminum sulfate hydrate, nickel sulfate hydrate or cerous chloride hydrate, so as to perform reaction, followed by recovering aluminoxane as its hydrocarbon solution.

(2) A procedure of allowing water, ice or water vapor to directly act on an organoaluminum compound such as trialkylaluminum in a medium such as benzene, toluene, ethyl ether or tetrahydrofuran, followed by recovering aluminoxane as its hydrocarbon solution.

(3) A procedure of allowing organotin oxide such as dimethyltin oxide or dibutyltin oxide to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-secbutylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferred are trialkylaluminums and tricycloalkylaluminums.

Also employable as the organoaluminum compound used for preparing the aluminoxane is isoprenylaluminum represented by the formula (i-$C_4H_9$)$_x$Al$_y$($C_5H_{10}$)$_z$ (wherein x, y, z are each a positive number, and $z \geq 2x$).

The organoaluminum compounds mentioned above may be used in combination of two or more kinds.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosine and gas oil; and halides of these aromatic, aliphatic and alicyclic hydrocarbons, particularly chlorides and bromides thereof.

Also employable are ethers such as ethyl ether and tetrahydrofuran. Of the solvents, particularly preferred are aromatic hydrocarbons.

The organoaluminum oxy-compounds mentioned above may be used in combination of two or more.

(C) Compound which reacts with the metallocene compound (A) to form an ion pair

The compound (C) which reacts with the metallocene compound [A] to form an ion pair includes such Lewis acid, ionic compounds, borane compounds and carborane compounds as described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 547,718.

The Lewis acid includes Mg-containing Lewis acid, Al-containing Lewis acid and B-containing Lewis acid. Of these, B-containing Lewis acid is preferred.

The Lewis acid which contains a boron atom is, for example, a compound represented by the following formula:

$BR^{11}R^{12}R^{13}$ wherein $R^{11}$, $R^{12}$ and $R^{13}$ are each independently a phenyl group which may have substituents such as fluorine, methyl and trifluoromethyl, or a fluorine atom.

Examples of the compounds represented by the above formula include trifluoroboron, triphenylboron, tris(4-fluorophenyl) boron, tris (3,5-difluorophenyl) boron, tris (4-fluoromethylphenyl) boron, tris (pentafluorophenyl) boron, tris (p-tolyl) boron, tris (o-tolyl) boron and tris (3,5-dimethylphenyl)boron. Of these, particularly preferred is tris(pentafluorophenyl)boron.

The ionic compound employable in the invention is a salt comprising a cationic compound and an anionic compound. The anion reacts with the metallocene compound (A) to render the compound (A) cationic and to form an ion pair so as to stabilize the transition metal cation seed. Examples of such anion include organoboron compound anion, organoarsenic compound anion and organoaluminum compound anion. Preferred is such anion as is relatively bulky and stabilizes the transition metal cation seed. Examples of cation include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

Of these, preferred are ionic compounds containing a boron compound as anion, and examples thereof include:

trialkyl-substituted ammonium salts, such as triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tri(n-butyl)ammoniumtetra(o-tolyl)boron and tri(n-butyl)ammoniumtetra (4-fluorophenyl)boron;

N,N,-dialkylanilinium salts, such as N,N-dimethylaniliniumtetra(phenyl)boron, N,N-diethylaniliniumtetra (phenyl) boron and N,N-2,4,6-pentamethylaniliniumtetra (phenyl) boron;

dialkylammonium salts, such as di(n-propyl)ammoniumtetra(pentafluorophenyl)boron and dicyclohexylammoniumtetra(phenyl)boron; and triarylphosphonium salts, such as triphenylphosphoniumtetra(phenyl)boron, tri(methylphenyl)phosphoniumtetra(phenyl)boron and tri(dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate can be also employed in the invention.

Further, the following compounds are also employable. (In the ionic compounds enumerated below, the counter ion is tri (n-butyl)ammonium, but the counter ion is in no way limited thereto.)

That is, there can be mentioned salts of anion, for example, bis [tri(n-butyl)ammonium]nonaborate, bis[tri(n-butyl)ammonium]decaborate, bis [tri (n-butyl)ammonium] undecaborate, bis [tri (n-butyl)ammonium]dodecaborate, bis [tri(n-butyl)ammonium]decachlorodecaborate, bis[tri(n-butyl)ammonium]dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl- 1-carbadecaborate and tri(n-butyl)ammoniumbromo-1-carbadodecaborate.

Moreover, borane compounds and carborane compounds are also employable. These compounds are employed as the Lewis acid or the ionic compounds.

Examples of the borane and carborane compounds include:

borane and carborane complex compounds and salts of carborane anion, such as decaborane (14), 7,8-dicarbaundecaborane(13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium-6-carbadecaborate (14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate; and carborane and salts of carborane, such as 4-carbanonaborane (14), 1,3-dicarbanonaborane (13), 6,9-dicarbadecaborane(14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carborane and metallic borane anion, for example, tri(n-butyl) ammoniumbis(nonahydride-1,3-dicarbanonaborate)cobaltate(III), tri(n-butyl)ammoniumbis(undecahydride-7,8-dicarbaundecarborate)ferrate(III), tri(n-butyl)ammoniumbis(undecahydride-7,8-dicarbaundecaborate) cobaltate(III), tri(n-butyl) ammoniumbis(undecahydride-7,8-dicarbaundecaborate) nickelate(III), tri(n-butyl)ammoniumbis(undecahydride-7,8-dicarbaundecaborate) cuprate(III), tri(n-butyl)ammoniumbis(undecahydride-7,8-dicarbaundecaborate) aurate(III), tri(n-butyl)ammoniumbis(nonahydride-7,8-dimethyl-7,8-dicarbaundecaborate)ferrate(III), tri(n-butyl)ammoniumhis-(nonahydride-7,8-dimethyl-7,8-dicarbaundecaborate)chromate(III), tri(n-butyl)ammoniumbis(tribromooctahydride-7,8-dicarbaundecaborate)cobaltate(III), tri(n-butyl)ammoniumbis(dodecahydridedi-carbadodecaborate)cobaltate(III), bis[tri(n-butyl)ammonium]bis(dodecahydridedodecaborate)nickelate(III), tris[tri(n-butyl)ammonium]bis(undecahydride-7-carbaundecaborate)chromate(III), bis [tri(n-butyl)ammonium]bis(undecahydride-7-carbaundecaborate)manganate(IV), bis[tri(n-butyl)ammonium]bis(undecahydride-7-carbaundecaborate)cobaltate(III) and bis[tri(n-butyl)ammonium]bis(undecahydride-7-carbaundecaborate)nickelate(IV).

The compounds (C) which react with the metallocene compound (A) to form an ion pair can be used singly or in combination of two or more kinds.

(D) Organoaluminum compound

The organoaluminum compound (D) used in the invention can be represented by, for example, the following formula (a):

$$R^{21}_n Al_{3-n} \quad (a)$$

wherein $R^{21}$ is a hydrocarbon group of 1 to 12 carbon atoms, X is a halogen atom or hydrogen, and n is 1 to 3.

In the above formula (a), $R^{21}$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (D) is a compound represented by the following formula (b):

$$R^{21}_n AlY_{3-n} \quad (b)$$

wherein $R^{21}$ is the same as above; Y is —$OR^{22}$ group, —$OSiR^{23}_3$ group, —$OAlR^{24}_2$ group, —$NR^{25}_2$ group, —$SiR^{26}_3$ group or —$N(R^{27})AlR^{28}_2$ group; n is 1 to 2; $R^{22}$, $R^{23}$, $R^{24}$ and $R^{25}$ are each methyl, ethyl, isopropyl, isobutyl, cyclohexyl, phenyl or the like; $R^{25}$ is hydrogen, methyl, ethyl, isopropyl, phenyl, trimethylsilyl or the like; and $R^{26}$ and $R^{27}$ are each methyl, ethyl or the like.

Examples of such organoaluminum compounds include:

(i) compounds of the formula $R^{21}_n Al(OR^{22})_{3-n}$, e.g., dimethylaluminum methoxide, diethylaluminum ethoxide and diisobutylaluminum methoxide;

(ii) compounds of the formula $R^{21}_n Al(OSiR^{23}_3)_{3-n}$, e.g., $(C_2H_5)_2Al(OSi(CH_3)_3)$, $(iso—C_4H_9)_2Al(OSi(CH_3)_3)$ and $(iso—C_4H_9)_2Al(OSi(C_2H_5)_3)$;

(iii) compounds of the formula $R^{21}_n Al(OAlR^{24}_2)_{3-n}$, e.g., $(C_2H_5)_2AlOAl(C_2H_5)_2$ and $(iso—C_4H_9)_2Al(OAl(iso—C_4H_9)_2)$;

(iv) compounds of the formula $R^{21}_n Al(NR^{25}_2)_{3-n}$, e.g., $(CH_3)_2Al(N(C_2H_5)_2)$, $(C_2H_5)2Al(NH(CH_3))$, $(CH_3)_2Al(NH(C_2H_5))$, $(C_2H_5)_2Al[N(Si(CH_3)_3)_2]$ and $(iso—C_4H_9)_2Al[N (Si(CH_3)_3)_2]$; and (v) compounds of the formula $R^{21}_n Al(SiR^{26}_3)_{3-n}$, e.g., $(iso—C_4H_9)_2Al(Si(CH_3)_3)$.

Of these, preferred are organoaluminum compounds of the formulas $R^{21}_3Al$, $R^{21}_n Al(OR^{22})_{3-n}$ and $R^{21}_n Al(OAlR^{24}_2)_{3-n}$, and particularly preferred are compounds of said formulas wherein $R^{21}$ is an isoalkyl group and n is 2. The organoaluminum compounds mentioned above may be used in combination of two or more kinds.

The specific metallocene catalyst used in the invention desirably contains the metallocene compound (A), and it can be prepared from the metallocene compound (A) and the organoaluminum oxy-compound (B). Further, the metallocene catalyst can be formed from the metallocene compound (A) and the compound (C) which reacts with the compound (A) to form an ion pair, or it can be formed from the metallocene compound (A), the organoaluminum oxy-compound (B) and the compound (C). In these embodiments, it is particularly preferred to use an organoaluminum compound (D) in combination.

In the present invention, the metallocene compound (A) is used in an amount of usually about 0.00005 to 0.1 mmol, preferably about 0.0001 to 0.05 mmol, in terms of the transition metal atom, per 1 liter of polymerization volume.

The organoaluminum oxy-compound (B) is used in such an amount that the amount of the aluminum atom becomes usually about 1 to 10,000 mol, preferably 10 to 5,000 mol, per 1 mol of the transition metal atom.

The compound (C) which reacts with the metallocene compound (A) to form an ion pair is used in such an amount that the amount of the boron atom becomes usually about 0.5 to 20 mol, preferably 1 to 10 mol, per 1 mol of the transition metal atom.

The organoaluminum compound (D) is used, if desired, in an amount of usually about 0 to 1,000 mol, preferably about 0 to 500 mol, per 1 mol of the aluminum atom in the organoaluminum oxy-compound (B) or the boron atom in the compound (C) which forms an ion pair.

When the ethylene (a), the α-olefin of 3 or more carbon atoms (b) and the nonconjugated polyene (c) are copolymerized using the above-mentioned metallocene catalyst, an ethylene-α-olefin-nonconjugated polyene random copolymer can be obtained with high polymerization activity.

If the ethylene (a), the α-olefin of 3 or more carbon atoms (b) and the nonconjugated polyene (c) are copolymerized using a Group VB transition metal compound type catalyst such as a vanadium catalyst, it is impossible to obtain a random copolymer with high polymerization activity. Further, in the preparation of EPDM using the Group VB transition metal compound type catalyst, the types of polyenes employable as the nonconjugated polyene (c) are limited to norbornene ring-containing polyenes such as ENB in many cases. On the other hand, when the Group IVB metallocene catalyst is used as in the present invention, the types of polyenes employable as the nonconjugated polyene (c) are not limited to the norbornene ring-containing polyenes, and the aforesaid various polyenes including chain nonconjugated polyenes such as MOD can be also polymerized.

In the copolymerization of ethylene (a), the α-olefin of 3 or more carbon atoms (b) and the nonconjugated polyene (c), the metallocene compound (A), the organoaluminum oxy-compound (B) and the compound (C) which forms an ion pair, and if desired, the organoaluminum compound (D), all of which constitute the metallocene compound, may be separately fed to the polymerization reactor, or the metallocene catalyst containing the metallocene compound (A), which is preliminarily prepared, may be added to the polymerization reaction system.

In the preparation of the metallocene catalyst, hydrocarbon media which are inert to the catalyst components can be employed. Examples of the inert hydrocarbon media include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbons may be used in combination.

The metallocene compound (A), the organoaluminum oxy-compound (B), the compound (C) which forms an ion pair and the organoaluminum compound (D) can be contacted with each other at a temperature of usually −100° to 200° C., preferably −70° to 100° C.

In the invention, copolymerization of the ethylene (a), the α-olefin of 3 or more carbon atoms (b) and the nonconjugated polyene (c) can be carried out under the conditions of a temperature of usually 40° to 200° C., preferably 50° to 150° C., particularly preferably 60° to 120° C., and a pressure of atmospheric pressure to 100 kg/cm$^2$, preferably atmospheric pressure to 50 kg/cm$^2$, particularly preferably atmospheric pressure to 30 kg/cm$^2$.

Although the copolymerization reaction can be performed by various processes, preferred is a solution polymerization process. In the solution polymerization process, the aforesaid hydrocarbons are employable as the polymerization solvents.

The copolymerization can be carried out either batchwise, semicontinuously or continuously, but it is preferably carried out continuously. The polymerization can be conducted in two more stages having different reaction conditions.

The above-described specific random copolymer is obtained by the present invention, and the molecular weight of this random copolymer can be regulated by varying the polymerization conditions such as polymerization temperature or controlling the amount of hydrogen (molecular weight regulator).

The reaction product immediately after the polymerization is recovered from the polymerization solution by a known separation or recovery method, and then dried to obtain a solid random copolymer.

Modified random copolymer

In the invention, the ethylene-α-olefin-nonconjugated polyene random copolymer may be graft modified with polar monomers.

The polar monomers include hydroxyl group-containing ethylenic unsaturated compounds, amino group-containing ethylenic unsaturated compounds, epoxy group-containing ethylenic unsaturated compounds, aromatic vinyl compounds, unsaturated carboxylic acids or their derivatives, vinyl ester compounds and vinyl chloride.

Examples of the hydroxyl group-containing ethylenic unsaturated compounds include:

(meth)acrylates, such as hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerol mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydroxyhexanoyloxy)ethyl acrylate; and 10-undecen-1-ol, 1-octene-3-ol, 2-methanolnorbornene, hydroxystyrene, hydroxyethyl vinyl ether, hydroxybutyl vinyl ether, N-methylolacrylamide, 2-(meth)acryloyloxyethyl acid phosphate, glycerol monoallyl ether, allyl alcohol, allyloxyethanol, 2-butene-1,4-diol and glycerol monoalcohol.

The amino group-containing ethylenic unsaturated compound is, for example, a vinyl monomer having at least one amino group or substituted amino group represented by the following formula:

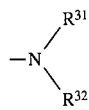

wherein $R^{31}$ is hydrogen, methyl or ethyl; and $R^{32}$ is hydrogen, an alkyl group of 1 to 12 carbon atoms (preferably 1 to 8 carbon atoms) or a cycloalkyl group of 6 to 12 carbon atoms (preferably 6 to 8 carbon atoms). The alkyl group and the cycloalkyl group may have a substituent.

Examples of the amino group-containing ethylenic unsaturated compounds include:

alkyl ester derivatives of acrylic acids or methacrylic acids, such as aminoethyl (meth)acrylate, propylaminoethyl (meth)acrylate, dimethylaminoethyl methacrylate, aminopropyl (meth)acrylate, phenylaminoethyl methacrylate and cyclohexylaminoethyl methacrylate;

vinylamine derivatives, such as N-vinyldiethylamine and N-acetylvinylamine;

allylamine derivatives, such as allylamine, methacrylamine, N-methylacrylamine, N,N-dimethylacrylamine and N,N-dimethylaminopropylacrylamine;

acrylamide derivatives, such as acrylamide and N-methylacrylamide;

aminostyrenes, such as p-aminostyrene; and 6-aminohexylsuccinimide and 2-aminoethylsuccinimide.

The epoxy group-containing ethylenic unsaturated compound employable in the invention is a monomer having at least one polymerizable unsaturated bond and at least one epoxy group in one molecule.

Examples of such epoxy group-containing ethylenic unsaturated compounds include:

glycidyl acrylate and glycidyl methacrylate;

dicarboxylic acid mono- and alkylglycidyl esters (number of carbon atoms of the alkyl group in the case of monoglycidyl esters: 1–12), such as mono- and diglycidyl esters of maleic acid, mono- and glycidyl esters of fumaric acid, mono- and diglycidyl esters of crotonic acid, mono and diglycidyl esters of tetrahydrophthalic acid, mono- and diglycidyl esters of itaconic acid, mono- and diglycidyl esters of butenetricarboxylic acid, mono- and diglycidyl esters of citraconic acid, mono- and diglycidyl esters of endo-cis-bicyclo[2,2,1]hept-5-ene-2,3-dicarboxylic acid (nadic acid™), mono- or diglycidyl esters of endo-cis-bicyclo[2,2,1]hept-5-ene-2-methyl-2,3-dicarboxylic acid (methylnadic acid™), and mono- and diglycidyl esters of allylsuccinic acid; and alkyl glycidyl ester of p-styrenecarboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

The aromatic vinyl compound is represented by the following formula:

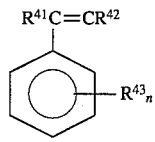

wherein $R^{41}$ and $R^{42}$ are each independently hydrogen or an alkyl group of 1 to 3 carbon atoms (e.g., methyl, ethyl, propyl or isopropyl), $R^{43}$ is a hydrocarbon group of 1 to 3 carbon atoms (e.g., methyl, ethyl, propyl or isopropyl) or a halogen atom (e.g., chlorine, bromine or iodine), and n is an integer of usually 0 to 5, preferably 1 to 5.

Examples of the aromatic vinyl compounds include styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Employable as the unsaturated carboxylic acids are unsaturated carboxylic acids, such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid; and derivatives of these acids (e.g., acid anhydrides, acid halides, amides, imides and esters).

Particular examples of the derivatives include malenyl chloride, malenylimide, maleic anhydride, itaconic anhydride, citraconic anhydride, tetrahydrophthalic anhydride, bicyclo[2, 2, 1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate.

Of these, preferred are (meth)acrylic acid, maleic anhydride, hydroxyethyl (meth)acrylate, glycidyl methacrylate and aminopropyl methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbenzoate, vinyl salicylate and vinyl cyclohexanecarboxylate.

Preparation of modified random copolymer

The modified random copolymer is obtained by graft polymerizing the random copolymer with the polar monomer. In the graft polymerization of the random copolymer with the polar monomer, the polar monomer is used in an amount of usually 1 to 100 parts by weight, preferably 5 to 80 parts by weight, based on 100 parts by weight of the random copolymer.

The graft polymerization is generally performed in the presence of a radical initiator.

The radical initiator is, for example, organic peroxide or an azo compound.

Examples of the organic peroxides include dicumyl peroxide, di-t-butyl peroxide, 2,5-dimethyl-2,5-bis(t-butylperoxy) hexane, 2,5-dimethyl-2,5-bis(t-butylperoxy) hexyne-3, 1,3-bis(t-butylperoxyisopropyl)benzene, 1,1-bis(t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide.

Examples of the azo compounds include azoisobutyronitrile and dimethylazoisobutyronitrile.

The radical initiator is desirably used in an amount of about 0.001 to 10 parts by weight based on 100 parts by weight of the random copolymer.

The radical initiator can be used by mixing it with the random copolymer and the polar monomer, or can be used after dissolving it in a small amount of an organic solvent. As the organic solvent, any organic solvents can be used without specific limitation as far as they can dissolve the radical initiator. For example, there can be used aromatic hydrocarbon solvents, such as benzene, toluene and xylene; aliphatic hydrocarbon solvents, such as pentane, hexane, heptane, octane, nonane and decane; alicyclic hydrocarbon solvents, such as cyclohexane, methylcyclohexane and decahydronaphthalene; chlorinated hydrocarbon solvents, such as chlorobenzene, dichlorobenzene, trichlorobenzene, methylene chloride, chloroform, carbon tetrachloride and tetrachloroethylene; alcohol solvents, such as methanol, ethanol, n-propanol, iso-propanol, n-butanol, sec-butanol and tert-butanol; ketone solvents, such as acetone, methyl ethyl ketone and methyl isobutyl ketone; ester solvents, such as ethyl acetate and dimethyl phthalate; and ether solvents, such as dimethyl ether, diethyl ether, di-n-amyl ether, tetrahydrofuran and dioxyanisol.

In the graft polymerization of the random copolymer with the polar monomer, a reducing material may be used. By the use of the reducing material, the graft quantity of the polar monomer can be increased.

The reducing material includes not only iron(II) ion, chromium ion, cobalt ion, nickel ion, palladium ion, sulfite, hydroxylamine and hydrazine but also compounds containing groups such as —SH, $SO_3H$, —$NHNH_2$, —COCH(OH)—.

Examples of such reducing materials include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material may be used in an amount of usually 0.001 to 5 parts by weight, preferably 0.1 to 3 parts by weight, based on 100 parts by weight of the random copolymer.

The graft modification of the random copolymer with the polar monomer can be carried out by a conventional known method. For example, the random copolymer is dissolved in an organic solvent, and to the solution are added the polar monomer and the radical initiator to perform reaction at a temperature of 70° to 200° C., preferably 80° to 190° C., for a reaction time of 0.5 to 15 hours, preferably 1 to 10 hours.

As the organic solvent, any organic solvents can be used without specific limitation as far as they can dissolve the random copolymer. For example, aromatic hydrocarbon solvents, such as benzene, toluene and xylene, and aliphatic hydrocarbon solvents, such as pentane, hexane and heptane, are employable.

The modified random copolymer can be also prepared by causing the random copolymer to react with the polar monomer in the absence of any solvent using an extruder or the like. In this case, the reaction is desirably conducted at a temperature not lower than the melting point of the random copolymer, specifically 120° to 250° C., for a reaction time of 0.5 to 10 minutes.

The modification quantity of the modified random copolymer thus obtained (i.e., graft quantity of the polar monomer) is desirably in the range of usually 0.1 to 50% by weight, preferably 0.2 to 30% by weight.

Vulcanizable rubber composition

The vulcanizable rubber composition of the invention which contains the above-described ethylene-α-olefin-nonconjugated polyene random copolymer may be used in the unvulcanized state, but if the composition is used as its vulcanizate, much more improved properties can be exhibited.

The vulcanizable rubber composition of the invention can be vulcanized by heating it using a vulcanizing agent or by irradiating it with electron rays without using a vulcanizing agent.

The vulcanizable rubber composition of the invention may appropriately contain other components than the ethylene-α-olefin-nonconjugated polyene random copolymer according to the use application, and it is desired the ethylene-α-olefin-nonconjugated polyene random copolymer is contained in an amount of not less than 20% by weight, preferably not less than 25% by weight, based on the whole amount of the rubber composition.

Examples of the other components include various chemicals such as reinforcing agent, inorganic filler, softening agent, aging inhibitor (stabilizer), processing aid, compounds which constitute foaming system (e.g., foaming agent and foaming aid), plasticizer, colorant, blowing agent and other rubbers. The kinds and the amounts of these components are properly determined according to the use application. Of these, preferably used are reinforcing agent, inorganic filler and softening agent. Details of these components are described below.

Reinforcing agent and inorganic filler

Examples of the reinforcing agents include carbon black such as SRF, GPF, FEF, MAF, HAF, ISAF, SAF, FT and MT, carbon black surface-treated with silane coupling agents, silica, activated calcium carbonate, powdery talc and powdery silicate.

Examples of the inorganic fillers include light calcium carbonate, heavy calcium carbonate, talc and clay.

In the rubber composition of the invention, the reinforcing agent and/or the inorganic filler may be contained in an amount of 10 to 300 parts by weight, preferably 10 to 200 parts by weight, based on 100 parts by weight of the ethylene-α-olefin-nonconjugated polyene random copolymer.

From the rubber composition containing the reinforcing agent in the above-mentioned amount, a vulcanized rubber improved in mechanical properties such as tensile strength, tear strength and abrasion resistance can be obtained.

If the inorganic filler is added in the above-mentioned amount, the hardness can be raised without deteriorating other properties of the vulcanized rubber, and the cost can be reduced.

Softening agent

As the softening agents, those conventionally added to rubbers can be widely used, and examples thereof include:

petroleum type softening agents, such as process oil, lubricant, paraffin, liquid paraffin, petroleum asphalt and vaseline;

coal tar type softening agents, such as coal tar and coal tar pitch;

fatty oil type softening agents, such as castor oil, linseed oil, rapeseed oil and coconut oil;

waxes, such as tall oil, factice, beeswax, carnauba wax and lanolin;

fatty acids and fatty acid salts, such as ricinolic acid, palmitic acid, barium stearate, calcium stearate and zinc laurate; and synthetic polymer materials, such as petroleum resin, atactic polypropylene and cumarone-indene resin.

Of these, preferred are petroleum type softening agents, and particularly preferred is process oil.

The softening agent can be contained in the rubber composition of the invention in an amount of 10 to 200 parts by weight, preferably 10 to 150 parts by weight, particularly preferably 10 to 100 parts by weight, based on 100 parts by weight of the ethylene-α-olefin-nonconjugated polyene random copolymer.

Aging inhibitor

The rubber composition of the invention preferably contains an aging inhibitor because the material life can be lengthened.

Examples of the aging inhibitors include:

aromatic secondary amine type stabilizers, such as phenylnaphthylamine, 4,4'-(α,α-dimethylbenzyl)diphenylamine and N,N'-di-2-naphthyl-p-phenylenediamine;

phenolic type stabilizers, such as 2,6-di-t-butyl-4-methylphenol and tetrakis-[methylene-3-(3',5'-di-t-butyl-4'-hydroxyphenyl)propionate]methane;

thioether type stabilizers, such as bis [2-methyl-4-(3-n-alkylthiopropionyloxy)-5-t-butylphenyl]sulfide;

benzomidazole type stabilizers, such as 2-mercaptobenzomidazole;

dithiocarbamate type stabilizers, such as nickel dibutyldithiocarbamate; and quinoline type stabilizers, such as polymer of 2,2,4-trimethyl-1,2-dihydroquinoline.

These stabilizers may be used in combination of two or more kinds.

The aging inhibitor can be used in an amount of not more than 5 parts by weight, preferably not more than 3 parts by weight, based on 100 parts by weight of the ethylene-α-olefin-nonconjugated polyene random copolymer. processing aid As the processing aids, those conventionally added to rubbers can be widely used. Examples thereof include various acids, such as ricinolic acid, stearic acid, palmitic acid and lauric acid; salts of these higher fatty acids, such as barium stearate, zinc stearate and calcium stearate; and esters.

The processing aid can be used in an amount of not more than 10 parts by weight, preferably not more than 5 parts by weight, based on 100 parts by weight of the ethylene-α-olefin-nonconjugated polyene random copolymer.

Vulcanizing agent

When the rubber composition of the invention is vulcanized by heating, compounds which constitute vulcanization system, such as a vulcanizing agent, a vulcanization accelerator and a vulcanization aid, are generally added to the rubber composition.

Examples of the vulcanizing agents employable herein include sulfur, sulfur compounds and organic peroxides.

There is no specific limitation on the type of sulfur, and for example, powdery sulfur, precipitated sulfur, colloidal sulfur, surface-treated sulfur and insoluble sulfur can be employed.

Examples of the sulfur compounds include sulfur chloride, sulfur dichloride, high-molecular weight polysulfide, morpholine disulfide, alkylphenol disulfide, tetramethylthiuram disulfide and selenium dimethyldithiocarbamate.

Examples of the organic peroxides include:

alkyl peroxides, such as dicumyl peroxide, di-t-butyl peroxide, di-t-butylperoxy-3,3,5-trimethylcyclohexane, t-butylcumyl peroxide, di-t-amyl peroxide, 2,5-dimethyl-2,5-di(t-butylperoxy)hexyne-3,2,5-dimethyl-2,5-di(benzoylperoxy)hexane, 2,5-dimethyl-2,5-di(t-butylperoxy) hexane, α,α'-bis (t-butylperoxy-m-isopropyl)benzene and t-butyl hydroperoxide;

peroxy esters, such as t-butyl peroxyacetate, t-butyl peroxyisobutyrate, t-butyl peroxypivalate, t-butylperoxymaleic acid, t-butyl peroxyneodecanoate, t-butyl peroxybenzoate, and di-t-butyl peroxyphthalate; and ketone peroxides, such as dicyclohexanone peroxide.

These vulcanizing agents may be used in combination of two or more kinds.

Of these, preferred are organic peroxides having a temperature, at which the half-life period thereof corresponds to one minute, of 130° to 200° C., for example, dicumyl peroxide, di-t-butyl peroxide, di-t-butylperoxy-3,3,5-trimethylcyclohexane, t-butylcumyl peroxide, di-t-amyl peroxide and t-butyl hydroperoxide.

When the vulcanizing agent is sulfur or the sulfur compound, it is used in an amount of 0.1 to 10 parts by weight, preferably 0.5 to 5 parts by weight, based on 100 parts by weight of the ethylene-α-olefin-nonconjugated polyene random copolymer. When the vulcanizing agent is organic peroxide, it is used in an amount of 0.0003 to 0.05 mol, preferably 0.001 to 0.03 mol, based on 100 g of the ethylene-α-olefin-nonconjugated polyene random copolymer.

Vulcanization accelerator

When sulfur or the sulfur compound is used as the vulcanizing agent, a vulcanization accelerator is preferably used in combination.

Examples of the vulcanization accelerators include:

sulfenamide compounds, such as N-cyclohexyl-2-benzothiazole sulfenamide, N-oxydiethylene-2-benzothiazole sulfenamide and N,N-diisopropyl-2-benzothiazole sulfenamide;

thiazole compounds, such as 2-mercaptobenzothiazole, 2-(2,4-dinitrophenyl)mercaptobenzothiazole, 2-(2,6-diethyl-4-morpholinothio)benzothiazole, dibenzothiazyl disulfide and 2-(4'-morpholinodithio)benzothiazole;

guanidine compounds, such as diphenylguanidine, triphenylguanidine, diorthonitrileguanidine, orthonitrile biguanide and diphenylguanidine phthalate;

aldehyde amines or aldehyde-ammonia compounds, such as acetaldehyde-aniline reaction product, butylaldehyde-aniline condensate, hexamethylenetetramine and acetaldehyde ammonia;

imidazoline compounds, such as 2-mercaptoimidazoline (ethylenethiourea);

thiourea compounds, such as thiocarbanilide, diethylthiourea, dibutylthiourea, trimethylthiourea and diorthotolylthiourea;

thiuram compounds, such as tetramethylthiuram monosulfide, tetramethylthiuram disulfide, tetraethylthiuram disulfide, tetrabutylthiuram disulfide and pentamethylenethiuram tetrasulfide;

dithio acid salt compounds, such as zinc dimethyldithiocarbamate, zinc diethyldithiocarbamate, zinc di-n-butyldithiocarbamate, zinc ethylphenyldithiocabamate, zinc butylphenyldithiocarbamate, sodium dimethyldithiocarbamate, selenium dimethyldithiocarbamate and tellurium dimethyldithiocarbamate;

xanthate compounds, such as zinc dibutylxanthate; and zinc white.

The vulcanization accelerator is desirably used in an amount of 0.1 to 20 parts by weight, preferably 0.2 to 10 parts by weight, based on 100 parts by weight of the ethylene-α-olefin-nonconjugated polyene random copolymer.

Vulcanization aid (polyfunctional monomer)

When the organic peroxide is used as the vulcanizing agent, a vulcanization aid (polyfunctional monomer) is preferably used in combination in an amount of 0.5 to 2 mol based on 1 mol of the organic peroxide, preferably in the almost equimolar amount.

Examples of the vulcanization aids include:

sulfur;

quinonedioxime compounds, such as p-quinonedioxime;

(meth)acrylate compounds, such as trimethylolpropane triacrylate and polyethylene glycol dimethacrylate;

allyl compounds, such as diallyl phthalate and triallyl cyanurate;

maleimide compounds, such as m-phenylene bismaleimide; and divinylbenzene.

Of the above-mentioned vulcanizing agents, sulfur or the sulfur compound, particularly sulfur, is preferably used in the invention because the properties of the rubber composition of the invention can be exhibited.

Foaming agent

When the rubber composition of the invention contains a compound which constitutes foaming system, such as a foaming agent or a foaming aid, the composition can be subjected to foam molding.

As the foaming agents, those generally used in the foam molding of rubbers can be widely used. Particular examples thereof include inorganic foaming agents, such as sodium bicarbonate, sodium carbonate, ammonium bicarbonate, ammonium carbonate and ammonium nitrite; nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonylhydrazide compounds, such as benzenesulfonylhydrazide, toluenesulfonylhydrazide, p,p'-oxybis-(benzenesulfonylhydrazide) and diphenylsulfone-3,3'-disulfonylhydrazide; and azide compounds, such as calcium azide, 4,4-diphenyldisulfonyl azide and p-toluenesulfonyl azide.

Of these, preferred are nitroso compounds, azo compounds and azide compounds.

The foaming agent can be used in an amount of 0.5 to 30 parts by weight, preferably 1 to 20 parts by weight, based on 100 parts by weight of the ethylene-α-olefin-nonconjugated polyene random copolymer. From the rubber composition containing the foaming agent in the above amount, foamed products having an apparent specific gravity of 0.03 to 0.8 g/cm$^3$ can be obtained.

A foaming aid can be used in combination with the foaming agent. When the foaming aid is used in combination, various effects such as lowering of decomposition temperature of the foaming agent, acceleration of decomposition thereof and uniformity of the resulting foam can be exerted. Examples of the foaming aids include organic acids, such as salicylic acid, phthalic acid, stearic acid and oxalic acid, urea and its derivatives.

The foaming aid can be used in an amount of 0.01 to 10 parts by weight, preferably 0.1 to 5 parts by weight, based on 100 parts by weight of the ethylene-α-olefin-nonconjugated polyene random copolymer.

Other rubber

The rubber composition of the invention may be used by blending with other rubbers within limits no prejudicial to the objects of the invention.

Examples of such rubbers include natural rubbers (NR); isoprene type rubbers, such as isoprene rubber (IR); and conjugated diene type rubbers, such as butadiene rubber (BR), styrene-butadiene rubber (SBR), acrylonitrile-butadiene rubber (NBR) and chloroprene rubber (CR).

Also employable are conventionally known ethylene-α-olefin copolymers, for example, ethylene-propylene random copolymer (EPR) and ethylene-α-olefin-nonconjugated polyene random copolymer except the aforementioned ethylene-α-olefin-nonconjugated polyene random copolymer such as EPDM.

The vulcanizable rubber composition of the invention can be prepared from the ethylene-α-olefin-nonconjugated polyene random copolymer and the above-mentioned other components by conventional processes for preparing rubber blends. For example, the ethylene-α-olefin-nonconjugated polyene random copolymer and other components are kneaded at 80° to 170° C. for 3 to 10 minutes using internal mixers such as Banbury mixer, kneader and intermixer, then the vulcanizing agent and the vulcanization accelerator or the vulcanization aid are added if necessary, and the resulting mixture is kneaded using rolls (e.g., open rolls) or a kneader at a roll temperature of 40° to 80° C. for 5 to 30 minutes, followed by rolling. Thus, a rubber composition (rubber blend) in the form of usually ribbon or sheet can be obtained. If the temperature in the kneading process using the internal mixer is low, the vulcanizing agent, the vulcanization accelerator and the foaming agent may be simultaneously kneaded.

Vulcanized rubber

A vulcanizate (vulcanized rubber) of the rubber composition of the invention can be obtained by a process generally comprising preforming the unvulcanized rubber composition into a desired shape using various means such as an extrusion molding machine, a calender roll, a press, an injection molding machine and a transfer molding machine, and simultaneously or thereafter heating the resulting preform in a vulcanizing bath or irradiating it with electron rays so as to perform vulcanization.

When the rubber composition is vulcanized by heating, the rubber composition is preferably heated at a temperature of 150° to 270° C. for 1 to 30 minutes using a heating bath of hot air, glass bead fluidized bed, UHF (ultrahigh frequency electromagnetic wave), steam or LCM (molten salt bath).

Among such copolymer rubber compositions of the invention as mentioned above, a copolymer rubber composition containing organic peroxide as a vulcanizing agent is preferably used as a hot-air crosslinking copolymer rubber composition.

The hot-air crosslinking copolymer rubber composition which contains the ethylene-α-olefin-nonconjugated polyene random copolymer and the organic peroxide of specific amount based on the amount of the random copolymer can be sufficiently crosslinked by hot air, whereby a crosslinked product having low surface tackiness and containing no extraordinary foam inside can be obtained. Further, from the hot-air crosslinking copolymer rubber composition, a hot-air crosslinked product also excellent in resistance to setting (permanent compression set) and heat aging resistance (heat resistance) can be obtained.

The hot-air crosslinking rubber composition contains the organic peroxide in the above-mentioned amount based on the amount of the ethylene-α-olefin-nonconjugated polyene random copolymer. This composition may contain other components in addition to the organic peroxide, and the composition preferably contains a vulcanization aid (polyfunctional monomer).

The vulcanizate (vulcanized rubber) of the hot-air crosslinking rubber composition can be generally obtained by a process comprising preforming the unvulcanized rubber blend described above by various methods such as methods of using extrusion molding machine or calendar roll to give a preform of desired shape and simultaneously heating the preform or thereafter introducing the preform into a vulcanizing bath and heating it therein.

For heating the preformed vulcanized rubber blend in the vulcanizing bath, a method of using hot air, glass bead fluidized bed, UHF (ultrahigh frequency electromagnetic wave), steam or LCM (molten salt bath) can be employed, and the heating is preferably carried out at 120° to 270° C. for 1 to 30 minutes.

In the preforming and vulcanization, a mold may be used or may not be used. If a mold is not used, preforming and vulcanization of the rubber composition are generally carried out continuously.

When the rubber composition is vulcanized by irradiation with electron rays without using a vulcanizing agent, the preformed rubber composition is irradiated with electron rays having energy of 0.1 to 10 MeV, preferably 0.3 to 2 MeV at an absorbed dose of 0.5 to 35 Mrad, preferably 0.5 to 10 Mrad.

In the preforming and vulcanization, a mold may be used or may not be used. If a mold is not used, preforming and vulcanization of the rubber composition are generally carried out continuously.

The rubber composition preformed and vulcanized as above (vulcanized rubber) can be used for automotive industrial parts such as weatherstrip, door glass run channel, window frame, radiator hose, brake parts and wiper blade; industrial rubber products such as rubber roll, belt, packing and hose; electrical insulating materials such as anode cap and grommet; civil engineering and building materials such as building gasket and civil engineering sheet; and rubberized fabrics.

The vulcanized foamed product obtained by foaming the rubber blend containing the foaming agent under heating can be used for heat insulating materials, cushioning materials, sealing materials, etc.

EFFECT OF THE INVENTION

The ethylene-α-olefin-nonconjugated polyene random copolymer according to the invention is excellent in processability and mechanical properties such as vulcanization strength as well as in weathering resistance and ozone resistance.

By the process for preparing an ethylene-α-olefin-nonconjugated polyene random copolymer according to the invention, an ethylene-α-olefin-nonconjugated polyene random copolymer excellent in processability and mechanical properties such as vulcanization strength, which was unobtainable by the conventional processes, can be prepared. Additionally, the process for preparing an ethylene-α-olefin-nonconjugated polyene random copolymer according to the invention is excellent in polymerization activity at high temperatures, and hence an ethylene-α-olefin-nonconjugated polyene random copolymer can be efficiently prepared.

The vulcanizable rubber composition of the invention which contains the above-mentioned specific ethylene-α-olefin-nonconjugated polyene random copolymer is excellent in mechanical strength, weathering resistance and ozone resistance as well as in processability.

From the rubber composition of the invention, vulcanized rubber molded products or vulcanized rubber foamed products excellent particularly in those properties can be produced.

EXAMPLE

The present invention will be further described with reference to the following examples, but it should be construed that the invention is in no way limited to those examples.

In the examples, the following metallocene compounds were used.

Zirconium compound A
rac-Dimethylsilylene-bis{1-(2-methyl-4-phenylindenyl)}zirconium dichloride

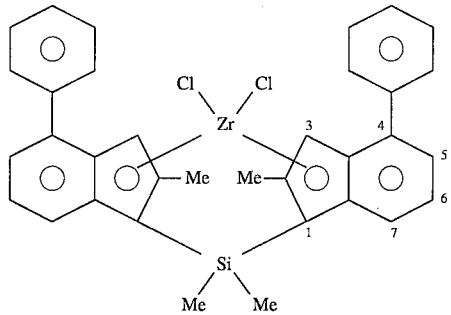

Zirconium compound B
rac-Dimethylsilylene-bis{1-(2-n-propyl-4-phenanthrylindenyl)}zirconium dichloride

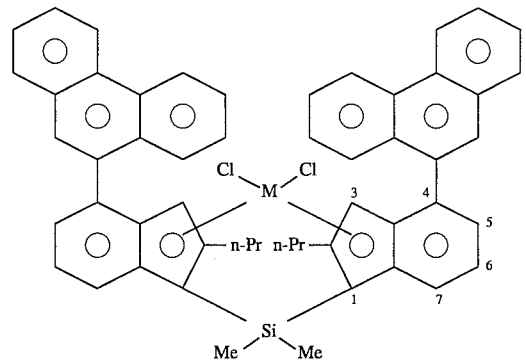

EXAMPLE 1

Pre-Contact of zirconium Compound with methylaluminoxane and preparation of catalyst solution The zirconium compound A of a predetermined amount and a toluene solution of methylaluminoxane (1.2 mg.atom/ml in terms of aluminum atom) were mixed by stirring at room temperature for 30 minutes in a dark place to prepare a toluene solution containing the zirconium compound A and methylaluminoxane. The Zr concentration in the toluene solution was 0.002 mmol/ml, and the methylaluminoxane concentration in the solution was 1.2 mg.atom/ml in terms of aluminum atom To the toluene solution was then added hexane in an amount of five times in volume as much as the toluene with stirring to prepare a catalyst solution having the following Zr concentration and methylaluminoxane concentration. The catalyst solution was used as a catalyst for the subsequent polymerization reaction.

Zr concentration: 0.00033 mmol/ml (i.e., 0.33 mmol/l)

Methylaluminoxane concentration (in terms of Al atom): 0.20 mmol/ml (i.e., 200 mmol/l)

Polymerization

In a 15-liter stainless steel polymerization reactor equipped with a stirrer, copolymerization of ethylene, propylene and 7-methyl-1,6-octadiene was continuously carried out in the following manner.

First, to the polymerization reactor were continuously fed, through the top of the reactor, dehydrated and purified hexane at a feed rate of 3.17 /l hr, the mixed solution of the zirconium compound A and methylaluminoxane obtained above at a feed rate of 0.03 /l hr, a hexane solution of triisobutylaluminum (concentration: 17 mmol/l) at a feed rate of 0.3 /l hr and a hexane solution of 7-methyl-1,6-octadiene (abbreviated to "MOD") (concentration: 0.15 l/l at a feed rate of 1.5 l/hr.

Further, to the reactor were continuously fed, through the top thereof, ethylene at a feed rate of 200 /l hr and propylene at a feed rate of 200 l/hr. The copolymerization reaction was carried out at 60° C. in such a manner that the average residence time became one hour (i.e., scale of polymerization: 5 liters).

Then, to the polymerization solution drawn out through the bottom of the reactor was added a small amount of methanol so as to terminate the polymerization reaction. The polymerization solution was subjected to a steam stripping treatment to separate a copolymer produced from the solvent, and the copolymer was dried at 100° C. for 24 hours under reduced pressure (100 mmHg).

Thus, an ethylene-propylene-7-methyl-1,6-octadiene random copolymer was obtained in an amount of 330 g per hour.

In the copolymer obtained, the molar ratio of units derived from ethylene to units derived from propylene was 70/30 (ethylene/propylene), the iodine value was 22 (g-iodine/100 g-polymer), and the intrinsic viscosity ($\eta$) as measured in Decalin, i.e. decahydronapthalene, at 135° C. was 2.6 dl/g. The glass transition temperature of the copolymer was $-61°$ C. and the $g\eta^*$ and $g'$ values thereof were 0.63 and 0.70, respectively.

In determing the $g'$ value, Waters ALC/GPC 150C was used as GPC, and GMH-HT and GMH-HTL (both manufactured by Toso K.K.) were used columns.

The results are set forth in Table 1.

EXAMPLES 2-7

An ethylene-$\alpha$-olefin-nonconjugated polyene random copolymer was obtained in the same manner as in Example 1 except that the copolymerization reaction was carried out under the polymerization conditions shown in Table 1 in place of the conditions of Example 1.

The results are set forth in Table 1.

TABLE 1

|  | Ex. 1 | Ex. 2 | Ex. 3 | Ex. 4 | Ex. 5 | Ex. 6 | Ex. 7 |
|---|---|---|---|---|---|---|---|
| Hexane flow rate (l/hr) | 3.17 | 3.17 | 3.17 | 3.17 | 3.17 | 1.67 | 3.17 |
| Mixed solution of Zr compound and aluminoxane | | | | | | | |
| (toluene/hexane = 1/5 by volume) | | | | | | | |
| Kind of Zr compound | Compound A | Compound A | Compound A | Compound A | Compound A | Compound A | Compound B |
| Zr concentration (mmol/l) | 0.33 | 0.33 | 0.33 | 0.33 | 0.33 | 0.33 | 0.33 |
| Al atom concentration (mmol/l) | 200 | 200 | 200 | 200 | 200 | 200 | 200 |
| Flow rate (l/hr) | 0.03 | 0.03 | 0.03 | 0.03 | 0.03 | 0.03 | 0.03 |
| Hexane solution of polyene | | | | | | | |
| Kind of polyene | MOD*2 | MOD | ENB*3 | ENB | MOD | ENB | ENB |
| Polyene concentration (l/l) | 0.15 | 0.15 | 0.05 | 0.05 | 0.15 | 0.05 | 0.05 |
| Flow rate (l/hr) | 1.5 | 1.5 | 1.5 | 1.5 | 1.5 | 1.5 | 1.5 |
| Ethylene flow rate (l/hr) | 200 | 200 | 200 | 200 | 200 | 200 | 200 |
| $\alpha$-olefin | | | | | | | |
| kind | Propylene | Propylene | Propylene | Propylene | 1-butene | 1-octene | Propylene |
| flow rate*1 (l/hr) | 200 | 300 | 200 | 300 | 200 | 1.5 | 200 |
| Polymerization temperature (°C.) | 60 | 60 | 60 | 60 | 50 | 50 | 60 |

*1)Propylene and 1-butene were each fed in the form of gas (flow rate: volume of gas).
1-Octene was fed in the form of liquid (flow rate: volume of liquid).
Common condition: Hexane solution of triisobutylaluminum (17 mmol/l) was fed in a feeding rate of 0.3 l/hr.
*2)MOD: 7-methyl-1,6-octadiene
*3)ENB: ethylidenenorbornene

|  | Ex. 1 | Ex. 2 | Ex. 3 | Ex. 4 | Ex. 5 | Ex. 6 | Ex. 7 |
|---|---|---|---|---|---|---|---|
| Results of polymerization | | | | | | | |
| Yield of random copolymer (g/hr) | 330 | 140 | 70 | 30 | 120 | 20 | 25 |
| Polymerization activity (g-polymer/mmol-Zr · hr) | 33000 | 14000 | 7000 | 3000 | 12000 | 2000 | 2500 |
| Basic properties of random copolymer | | | | | | | |
| Component | Ethylene/ propylene/ MOD | Ethylene/ propylene/ MOD | Ethylene/ propylene/ ENB | Ethylene/ propylene/ ENB | Ethylene/ 1-butene/ MOD | Ethylene/ 1-octene/ ENB | Ethylene/ propylene/ ENB |
| Ethylene/$\alpha$-olefin (molar ratio) | 70/30 | 58/42 | 72/28 | 62/38 | 79/21 | 80/20 | 71/29 |
| Iodine value (g-iodine/100 g-polymer) | 22 | 14 | 24 | 18 | 20 | 11 | 20 |
| Intrinsic viscosity [$\eta$] (dl/g) | 2.6 | 1.6 | 2.3 | 2.0 | 2.3 | 1.9 | 3.9 |
| $g\eta^*$ | 0.63 | 0.77 | 0.59 | 0.65 | 0.57 | 0.58 | 0.59 |
| $g'$ | 0.70 | 0.80 | 0.63 | 0.69 | 0.62 | 0.64 | 0.66 |

MOD: n-methyl-1,6-octadiene, ENB: ethylidenenorbornene

COMPARATIVE EXAMPLE 1

In a 2-liter polymerization reactor equipped with a stirrer, copolymerization of ethylene, propylene and ethylidenenorbornene (ENB) was continuously carried out in the following manner.

To the polymerization reactor were continuously fed, through the top of the reactor, a hexane solution of ENB (concentration: 36 g/l) at a feed rate of 0.5 l/hr, a hexane solution of $VO(OC_2H_5)Cl_2$ (concentration: 8 mmol/l) as a catalyst at a feed rate of 0.5 l/hr, a hexane solution of ethylaluminum sesquichloride $[Al(C_2H_5)_{1.5}Cl_{1.5}]$ (concentration: 64 mmol/l) at a feed rate of 0.5 l/hr and hexane at a feed rate of 0.5 l/hr, while the polymerization solution was continuously drawn out through the bottom of the reactor so that the amount of the polymerization solution in the reactor was kept to be 1 liter.

Further, to the reactor were fed ethylene at a feed rate of 130 l/hr, propylene at a feed rate of 170 l/hr and hydrogen at a feed rate of 40 l/hr using a bubble tube.

The copolymerization reaction was carried out by circulating a cooling medium through a jacket provided outside of the reactor, with maintaining the temperature at 20° C.

The copolymerization reaction was carried out under the reaction conditions as described above to obtain a polymerization solution containing an ethylene-propylene ethylidenenorbornene copolymer.

Then, the polymerization solution obtained was deashed using hydrochloric acid, and a large amount of methanol was added to precipitate a polymer, followed by vacuum drying at 100° C. for 24 hours.

Thus, an ethylene-propylene-ethylidenenorbornene copolymer (rubber) was obtained in an amount of 53 g per hour.

In the copolymer obtained, the molar ratio of units derived from ethylene to units derived from propylene was 72/28 (ethylene/propylene), the iodine value was 21 (g-iodine/100 g-polymer), and the intrinsic viscosity ($\eta$) as measured in Decalin, i.e. decahydronapthalene, at 135° C. was 2.1 dl/g. The $g\eta'$ and $g'$ values of the copolymer were 0.98 and 0.99, respectively.

It was confirmed that when the vanadium catalyst was used as above, the $g\eta^*$ and $g'$ values became near to 1, so that no long-chain branch was formed. The results are set forth in Table 2.

EXAMPLE 8

Polymerization

In a 15-liter stainless steel polymerization reactor equipped with a stirrer, copolymerization of ethylene, propylene and 5-ethylidene-2-norbornene (also referred to "ENB") was continuously carried out in the following manner.

First, to the polymerization reactor were continuously fed, through the top of the reactor, dehydrated and purified hexane at a feed rate of 3.17 l/hr, the mixed solution of the zirconium compound A and methylaluminoxane obtained in Example 1 at a feed rate of 0.03 l/hr, a hexane solution of triisobutylaluminum (concentration: 17 mmol/l) at a feed rate of 0.3 l/hr and a hexane solution of ENB (concentration: 0.015 mmol/l) at a feed rate of 1.5 l/hr.

Further, to the reactor were continuously fed, through the top thereof, ethylene at a feed rate of 200 l/hr and propylene at a feed rate of 200 l/hr. The copolymerization reaction was carried out at 60° C. in such a manner that the average residence time became one hour (i.e., scale of polymerization: 5 liters).

Then, to the polymerization solution drawn out through the bottom of the reactor was added a small amount of methanol so as to terminate the polymerization reaction. The polymerization solution was subjected to a steam stripping treatment to separate a copolymer from the solvent, and the copolymer was dried at 100° C. for 24 hours under reduced pressure (100 mmHg).

Thus, an ethylene-propylene-ENB random copolymer was obtained in an amount of 70 g per hour.

In the copolymer obtained, the molar ratio of units derived from ethylene to units derived from propylene was 70/30 (ethylene/propylene), the iodine value was 22 (g-iodine/100 g-polymer), and the intrinsic viscosity ($\eta$) as measured in Decalin, i.e. decahydronapthalene, at 135° C. was 2.3 dl/g. The $g\eta^*$ and $g'$ values of the copolymer were 0.65 and 0.70, respectively.

The results are set forth in Table 2.

EXAMPLES 9–11

An ethylene-α-olefin-polyene random copolymer was obtained in the same manner as in Example 8 except that the copolymerization reaction was carried out under the polymerization conditions shown in Table 2 in place of the conditions of Example 8.

The results are set forth in Table 2.

TABLE 2

|  | Ex. 8 | Ex. 9 | Ex. 10 | Ex. 11 | Comp. Ex. 1 |
|---|---|---|---|---|---|
| α-Olefin | Propylene | Propylene | 1-Butene | 1-Butene | Propylene |
| Diene | ENB | ENB | ENB | ENB | ENB |
| Ethylene/α-Olefin (molar ratio) | 70/30 | 63/37 | 78/22 | 72/28 | 72/28 |
| Iodine value | 22 | 25 | 21 | 22 | 21 |
| ($\eta$) (dl/g) | 2.3 | 2.7 | 2.9 | 2.5 | 2.1 |
| $g\eta^*$ | 0.65 | 0.57 | 0.68 | 0.62 | 0.98 |
| $g'$ | 0.70 | 0.61 | 0.72 | 0.67 | 0.99 |

ENB: 5-Ethylidene-2-norbornene

The evaluation test methods of the ethylene-α-olefin-nonconjugated polyene random copolymer composition and the vulcanized rubber in the following examples are described below.

(1) Properties of unvulcanized rubber

The properties of the unvulcanized rubber were measured in accordance with JIS-K-6300.

(2) Tensile test

From the upper part of the vulcanized tubular sponge S rubber, a specimen was punched in the longitudinal direction of the sponge rubber by means of a dumbbell of No. 3 described in JIS-K-6301 (1989). The specimen was subjected to a tensile test in accordance with JIS-K-6301, Section 3, under the conditions of a measuring temperature of 25° C. and a tensile rate of 500 mm/min to measure tensile stress at break $T_B$ and elongation at break $E_B$.

(3) Measurement of specific gravity

From the upper part of the vulcanized tubular sponge rubber, a specimen of 20 mm×20 mm was punched, and the surface of the specimen was wiped with alcohol to remove stain. The specimen was fixed to an automatic specific gravity hydrometer (M-1 type, manufactured by Toyo Seiki Seisakusho) in an atmosphere of 25° C., and the specific gravity of the specimen was measured from a difference between the mass in air and the mass in pure water.

(4) Permanent compression set test

The vulcanized tubular sponge rubber was cut to give a specimen of 30 mm, and the specimen was fixed to a permanent compression set measuring mold. The specimen was compressed so that the height of the specimen became ½ of the height before application of a load. Then, the specimen with the mold was heat-treated in an oven at 70° C. for 200 hours. After the specimen was allowed to stand for cooling for 30 minutes, the height of the specimen was measured, and the permanent compression set of the specimen was calculated from the following equation.

$$\text{Permanent compression set (\%)} = \frac{t_0 - t_1}{t_0 - t_2} \times 100$$

$t_0$: Height of specimen before test $t_1$: Height of specimen after heat treatment and cooling for 30 minutes $t_2$: Height of specimen in the state where specimen is fixed to measuring mold (5) Measurement of shape retention The vulcanized tubular sponge rubber was measured on its sectional height and sectional width, and a ratio of the height to the width was taken as a shape retention ratio.

$$\text{Shape retention ratio (\%)} = \frac{L}{D} \times 100$$

L: Height of tubular sponge rubber

D: Width of tubular sponge rubber (6) Measurement of surface roughness The surface roughness of the sponge rubber was evaluated by expressing the protrusions and depressions on the upper surface of the sponge rubber by numerals using a feeler type surface roughness measuring device. In detail, the tubular sponge rubber was cut to give a specimen having a length of 50 mm. From the total ($h_1$) of the heights of ten protrusions of from the highest protrusion to the tenth protrusion from the highest one, the total ($h_2$) of the heights of ten depressions of from the deepest depression to the tenth depression from the deepest one was subtracted. The obtained value ($h_1-h_2$) was divided by 10, and the value finally obtained was taken as the surface roughness of the sponge rubber.

EXAMPLE 12

The ethylene-α-olefin-nonconjugated polyene random copolymer prepared in Example 8 and other components were blended in the amounts shown in Table 3 to prepare a rubber blend (rubber composition).

That is, the ethylene-α-olefin-nonconjugated polyene random copolymer, paraffinic oil, carbon black, stearic acid, dimethyldistearylammonium chloride and activated zinc white were kneaded in a 1.7-liter Banbury mixer (manufactured by Kobe Seikosho K.K.) for 10 minutes. To the kneadate were further added a vulcanizing agent and other additives, and they were kneaded in a 14-inch open roll (F/B=50/50° C.) to obtain a rubber blend.

The rubber blend was then extruded using a 50 mm extruder equipped with a tubular die (inner diameter: 10 mm, thickness: 1 mm) under the conditions of a die temperature of 80° C. and a cylinder temperature of 60° C., to produce a tubular molded product. The molded product was vulcanized at 220° C. for 6 minutes in an air oven to obtain a sponge rubber. The results are set forth in Table 4.

EXAMPLES 13–15

A rubber blend (rubber composition) was prepared in the same manner as in Example 12 except that the ethylene-α-olefin-nonconjugated polyene random copolymer was replaced with the ethylene-α-olefin-nonconjugated polyene random copolymer prepared in each of Examples 9 to 11. Using the rubber blend, a sponge rubber was obtained in the same manner as in Example 12. The results are set forth in Table 4.

COMPARATIVE EXAMPLE 2

A rubber blend (rubber composition) was prepared in the same manner as in Example 12 except that the ethylene-α-olefin-nonconjugated polyene random copolymer was replaced with the ethylene-α-olefin-polyene copolymer prepared in Comparative Examples 1. Using the rubber blend, a sponge rubber was obtained in the same manner as in Example 12. The results are set forth in Table 4.

TABLE 3

| | Component | Part(s) by weight |
|---|---|---|
| Copolymer | Ethylene-α-olefin-polyene random copolymer | 100 |
| Softening agent | Paraffinic oil (Sunflex 2280 of Nippon Sun Petroleum K.K.) | 70 |
| Inorganic filler | SRF-HS carbon black (Asahi 50HG of Asahi Carbon K.K.) | 90 |
| | Calcium oxide | 5 |
| Processing aid | Stearic acid | 2 |
| | Dimethyldistearylammonium chloride | 2 |
| vulcanizing agent | Sulfur | 1.5 |
| Vulcanization accelerator | Activated zinc white | 5 |
| | 2-Mercaptobenzothiazole | 0.8 |
| | 2-(4'-Morpholinodithio)-benzothiazole | 1.2 |
| | Zinc dibutyldithiocarbamate | 2 |
| | Ethylene thiourea | 1 |
| Foaming agent | p,p'-Oxybis(benzenesulfonyl hydrazide) | 3.5 |

TABLE 4

| | Ex. 12 | Ex. 13 | Ex. 14 | Ex. 15 | Comp. Ex. 2 |
|---|---|---|---|---|---|
| $T_B$ (kg/cm$^2$) | 23 | 25 | 26 | 22 | 21 |
| $E_B$ (%) | 250 | 270 | 260 | 280 | 240 |
| Specific gravity (g/cm$^3$) | 0.48 | 0.52 | 0.54 | 0.49 | 0.44 |
| Permanent compression set (%) | 32 | 30 | 33 | 29 | 34 |
| Shape retention (%) | 83 | 85 | 86 | 81 | 63 |
| Surface roughness | 9 | 7 | 8 | 9 | 14 |

What is claimed is:

1. An ethylene-α-olefin-nonconjugated polyene random copolymer which is a random copolymer of (a) ethylene, (b) an α-olefin of 3 or more carbon atoms and (c) a nonconjugated polyene containing, in one molecule, one carbon-to-carbon double bond polymerizable by a metallocene catalyst among carbon-to-carbon double bonds, and has the following properties:

(i) said copolymer contains (a) units derived from ethylene and (b) units derived from the α-olefin of 3 or more carbon atoms in a molar ratio of 40/60 to 95/5 ((a)/(b)), (ii) the iodine value is in the range of 1 to 50, (iii) the intrinsic viscosity (η), as measured in decahydronaphthalene at 135° C. is in the range of 0.1 to 8.0 dl/g, and (iv) the ratio gη* of the intrinsic viscosity (η) of said copolymer defined above to the intrinsic viscosity [η]blank of a linear ethylene-propylene copolymer having the same weight-average molecular weight, measured by light scattering method, as the ethylene-α-olefin-nonconjugated polyene random copolymer and having an ethylene content of 70% by mol, (η)/(η)blank, is in the range of 0.2 to 0.9.

2. An ethylene-α-olefin-nonconjugated polyene random copolymer which is a random copolymer of (a) ethylene, (b) an α-olefin of 3 or more carbon atoms and (c) a nonconjugated polyene containing, in one molecule, one carbon-to-carbon double bond polymerizable by a metallocene catalyst among carbon-to-carbon double bonds, and has the following properties:

(i) said copolymer contains units derived from ethylene (a) and units derived from the α-olefin of 3 or more carbon atoms (b) in a molar ratio of (a)/(b) of 40/60 to 95/5, (ii) the iodine value is in the range of 1 to 50, (iii) the intrinsic viscosity (η), as measured in decahydronaphthalene at 135° C., is in the range of 0.1 to 8.0 dl/g, and (iv) the ratio g' of the intrinsic viscosity (η) of said random copolymer defined above to the intrinsic viscosity (η)blank' calculated as a linear ethylene-propylene copolymer having an ethylene content of 70% by mol which is determined by measurement of gel permeation chromatography (GPC) of ethylene-α-olefin-nonconjugated polyene random copolymer in orthodichlorobenzene at 140° C., (η)/(η)blank', is in the range of 0.2 to 0.9.

3. A vulcanizable rubber composition containing the ethylene-α-olefin-nonconjugated polyene random copolymer as claimed in claim 1.

4. The vulcanizable rubber composition as claimed in claim 3, containing a reinforcing agent and/or an inorganic filler in an amount of 10 to 200 parts by weight based on 100 parts by weight of the ethylene-α-olefin-nonconjugated polyene random copolymer.

5. The vulcanizable rubber composition as claimed in claim 3, containing a softening agent in an amount of 10 to 200 parts by weight based on 100 parts by weight of the ethylene-α-olefin-nonconjugated polyene random copolymer.

6. A vulcanized rubber obtained from the vulcanizable rubber composition as claimed in any one of claims 3 to 5.

7. A vulcanizable rubber composition containing the ethylene-α-olefin-nonconjugated polyene random copolymer as claimed in claim 2.

8. The vulcanizable rubber composition as claimed in claim 7, containing a reinforcing agent and/or an inorganic filler in an amount of 10 to 200 parts by weight based on 100 parts by weight of the ethylene-α-olefin-nonconjugated polyene random copolymer.

9. The vulcanizable rubber composition as claimed in claim 7, containing a softening agent in an amount of 10 to 200 parts by weight based on 100 parts by weight of the ethylene-α-olefin-nonconjugated polyene random copolymer.

10. A vulcanized rubber obtained from the vulcanizable rubber composition as claimed in any one of claims 7 to 9.

11. The ethylene-α-olefin-nonconjugated polyene random copolymer of claim 1 or 2 wherein the α-olefin is a member selected from the group consisting of propylene, 1-butene, 1-hexene, and 1-octene and the nonconjugated polyene is a member selected from the group consisting of 7-methyl-1,6-octadiene, 5-ethylidene-2-norbornene and 1,4-hexadiene.

12. The ethylene-α-olefin-nonconjugated polyene random copolymer of claim 1 or 2 wherein the (a) units derived from ethylene and the (b) units derived from α-olefin are in a molar ratio of 55/45 to 90/10 and the iodine value of the copolymer is 5 to 35.

13. A process for preparing an ethylene-α-olefin-nonconjugated polyene random copolymer, in which the ethylene-α-olefin-nonconjugated polyene random copolymer as claimed in claim 1 or 2 is prepared by copolymerizing (a) ethylene, (b) an α-olefin of 3 or more carbon atoms and (c) a nonconjugated polyene containing, in one molecule, one carbon-to-carbon double bond polymerized by a metallocene catalyst among carbon-to-carbon double bonds, in the presence of a metallocene catalyst containing a metallocene compound represented by the following formula (I):

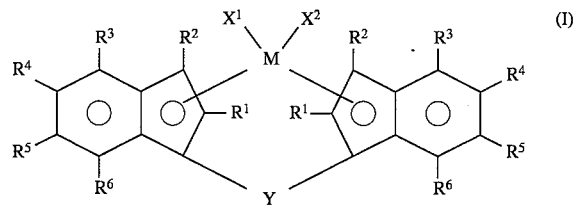

wherein M is a transition metal of Group IVB of the periodic table, $R^1$ is a hydrocarbon group of 1 to 6 carbon atoms, $R^2$, $R^4$, $R^5$ and $R^6$ may be the same as or different from each other, and are each hydrogen, a halogen atom or a hydrocarbon group of 1 to 6 carbon atoms, $R^3$ is an aryl group of 6 to 16 carbon atoms which may be substituted with a halogen atom, a hydrocarbon group of 1 to 20 carbon atoms or an organosilyl group, $X^1$ and $X^2$ may be the same as or different from each other, and are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms).

14. The process of claim 3 wherein the metallocene compound is a member selected from the group consisting of rac-Dimethylsilylene-bis(1-(2-methyl-4-phenylindenyl))zirconinum dichloride and rac-Dimethylsilylene-bis(1-(2-n-propyl-4-phenanthrylindenyl)) zirconium dichloride.

\* \* \* \* \*

UNITED STATES PATENT AND TRADEMARK OFFICE
CERTIFICATE OF CORRECTION

PATENT NO.   : 5,610,254
DATED        : March 11, 1997
INVENTOR(S)  : Toshihiro SAGANE, et al.

It is certified that error appears in the above-indentified patent and that said Letters Patent is hereby corrected as shown below:

At column 6, formula (2), delete "$(\eta)_{i-blank'} = 7.2 \times 10^{31}\ ^{4}M_{i-EPR}^{0.667}$" and substitute therefor --$(\eta)_{i-blank'} = 7.2 \times 10^{-4}M_{i-EPR}^{0.667}$--; and column 6, formula (3), delete "$(\eta)_{blank} = \Sigma_{107i} \cdot (\eta)_{i-blank}/\Sigma_{\omega}i$" and substitute therefor --$(\eta)_{blank'} = \Sigma_{\omega i} \cdot (\eta)_{i-blank'}/\Sigma_{\omega i}$--.

Signed and Sealed this

Fourteenth Day of December, 1999

Attest:

Q. TODD DICKINSON

*Attesting Officer*    Acting Commissioner of Patents and Trademarks